United States Patent
Kobayashi

(10) Patent No.: US 11,235,724 B2
(45) Date of Patent: Feb. 1, 2022

(54) PASSENGER PROTECTION APPARATUS

(71) Applicant: Autoliv Development AB, Vargarda (SE)

(72) Inventor: Yuto Kobayashi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 134 days.

(21) Appl. No.: 16/499,542

(22) PCT Filed: Feb. 5, 2018

(86) PCT No.: PCT/JP2018/003876
§ 371 (c)(1),
(2) Date: Sep. 30, 2019

(87) PCT Pub. No.: WO2018/179850
PCT Pub. Date: Oct. 4, 2018

(65) Prior Publication Data
US 2021/0162942 A1 Jun. 3, 2021

(30) Foreign Application Priority Data

Mar. 30, 2017 (JP) .............................. JP2017-066756
Jul. 12, 2017 (JP) .............................. JP2017-136590

(51) Int. Cl.
*B60R 21/207* (2006.01)
*B60R 21/231* (2011.01)
*B60R 21/233* (2006.01)
*B60R 21/2338* (2011.01)

(52) U.S. Cl.
CPC .......... *B60R 21/207* (2013.01); *B60R 21/233* (2013.01); *B60R 21/23138* (2013.01);
(Continued)

(58) Field of Classification Search
CPC ............ B60R 21/23138; B60R 21/207; B60R 21/233; B60R 2021/23308; B60R 2021/23386; B60R 2021/23146
See application file for complete search history.

(56) References Cited

U.S. PATENT DOCUMENTS 7,681,907 B2 * 3/2010 Svenbrant ............. B60R 21/207
280/728.2
8,985,625 B2 3/2015 Gwon et al.
(Continued)

FOREIGN PATENT DOCUMENTS

CA 2993843 A1 * 8/2018 ............. B60R 21/26
DE 102009021635 A1 * 11/2010 ........... B60R 21/207
(Continued)

OTHER PUBLICATIONS

Written Opinion of the International Searching Authority (in Japanese and English) dated Apr. 10, 2018 in corresponding PCT/JP2018/003876.

*Primary Examiner* — Karen Beck
(74) *Attorney, Agent, or Firm* — Harness, Dickey & Pierce, P.L.C.; Stephen T. Olson

(57) ABSTRACT

[Problem] To provide a side airbag apparatus capable of quickly and properly restraining a passenger in the initial stage of deploying an airbag, along with a passenger protection apparatus including this.
[Resolution means] A side airbag apparatus according to the present invention includes: an airbag for restraining a passenger when expanded and deployed; and an inflator for supplying expansion gas to the airbag. The airbag includes: a first chamber which houses the inflator and is deployed outside in the vehicle width direction of the frame side wall part; and a second chamber which is deployed inside in the vehicle width direction of the frame side wall part. In addition, the first chamber is deployed such that at least a
(Continued)

portion thereof, as seen from the vehicle side, overlaps the frame side wall part. At this time, the rear end part of an expanding region of the second chamber, as seen from the vehicle side, is formed in front of the rear end part of the first chamber.

18 Claims, 19 Drawing Sheets

(52) U.S. Cl.
  CPC ............... *B60R 2021/23146* (2013.01); *B60R 2021/23308* (2013.01); *B60R 2021/23386* (2013.01)

(56) References Cited

U.S. PATENT DOCUMENTS

| | | | |
|---|---|---|---|
| 9,358,943 B2 | 6/2016 | Borieson et al. | |
| 10,493,940 B2* | 12/2019 | Sugishima | ............ B60R 21/233 |
| 10,744,970 B2* | 8/2020 | Ohno | ..................... B60R 21/215 |
| 2012/0091695 A1* | 4/2012 | Richez | .................. B60R 21/207 280/729 |
| 2015/0367804 A1* | 12/2015 | Fujiwara | ........... B60R 21/23138 280/730.2 |
| 2016/0114757 A1* | 4/2016 | Fujiwara | ................ B60R 21/233 280/729 |
| 2017/0174174 A1* | 6/2017 | Ohno | ..................... B60R 21/235 |
| 2017/0225640 A1* | 8/2017 | Ohno | ..................... B60R 21/239 |
| 2019/0084516 A1* | 3/2019 | Fu | ......................... B60R 21/207 |
| 2019/0135219 A1 | 5/2019 | Kobayashi et al. | |
| 2019/0283701 A1 | 9/2019 | Zauritz | |

FOREIGN PATENT DOCUMENTS

| | | | |
|---|---|---|---|
| JP | 2006-008105 A | | 1/2006 |
| JP | 2009-023494 A | | 2/2009 |
| JP | 2016203878 A | * | 12/2016 |
| WO | WO-2010/133280 A1 | | 11/2010 |
| WO | WO-2015/045613 A1 | | 4/2015 |
| WO | WO-2019026538 A1 | * | 2/2019 ....... B60R 21/23138 |

* cited by examiner

[FIG. 1]
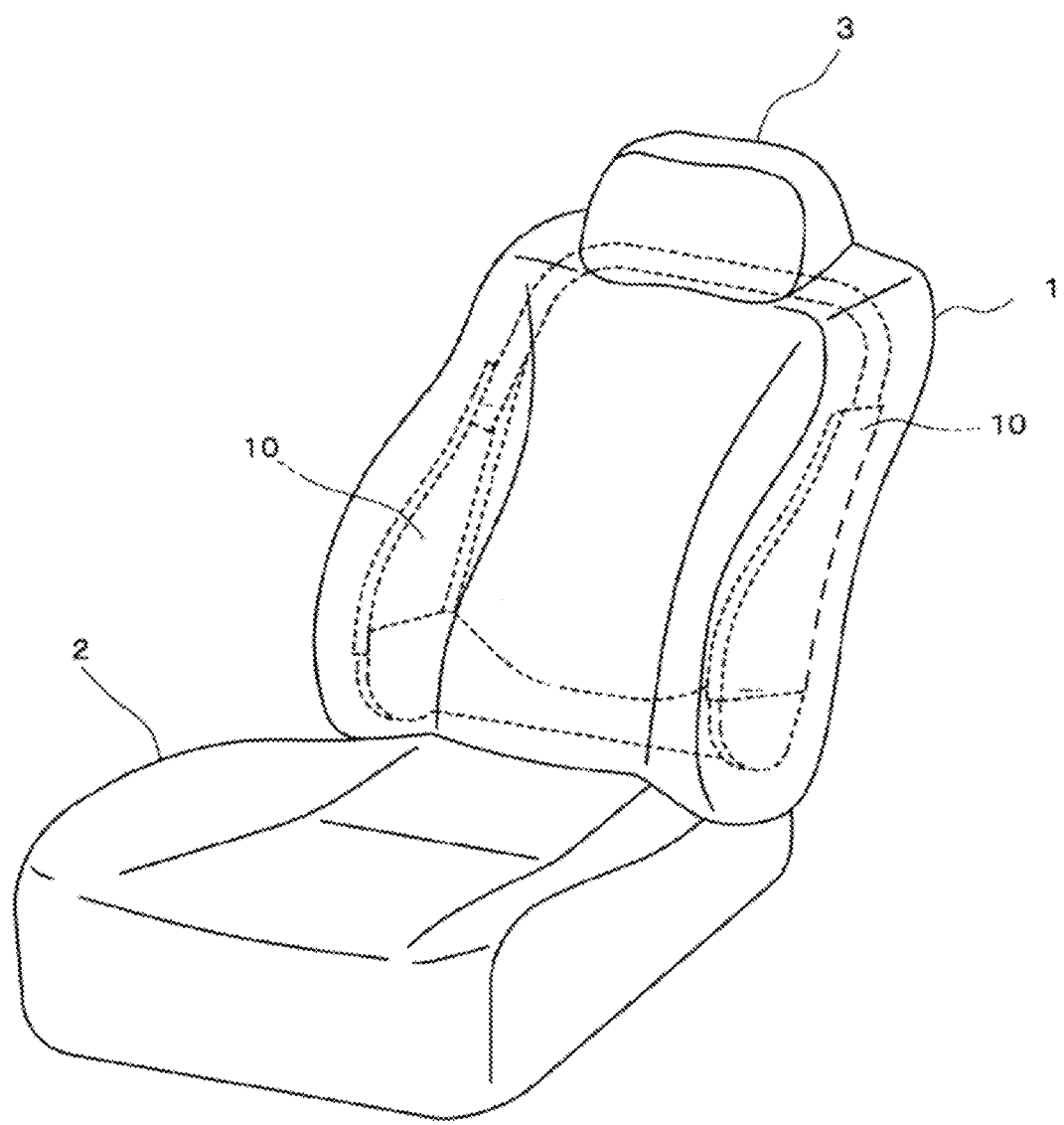

[FIG. 2]
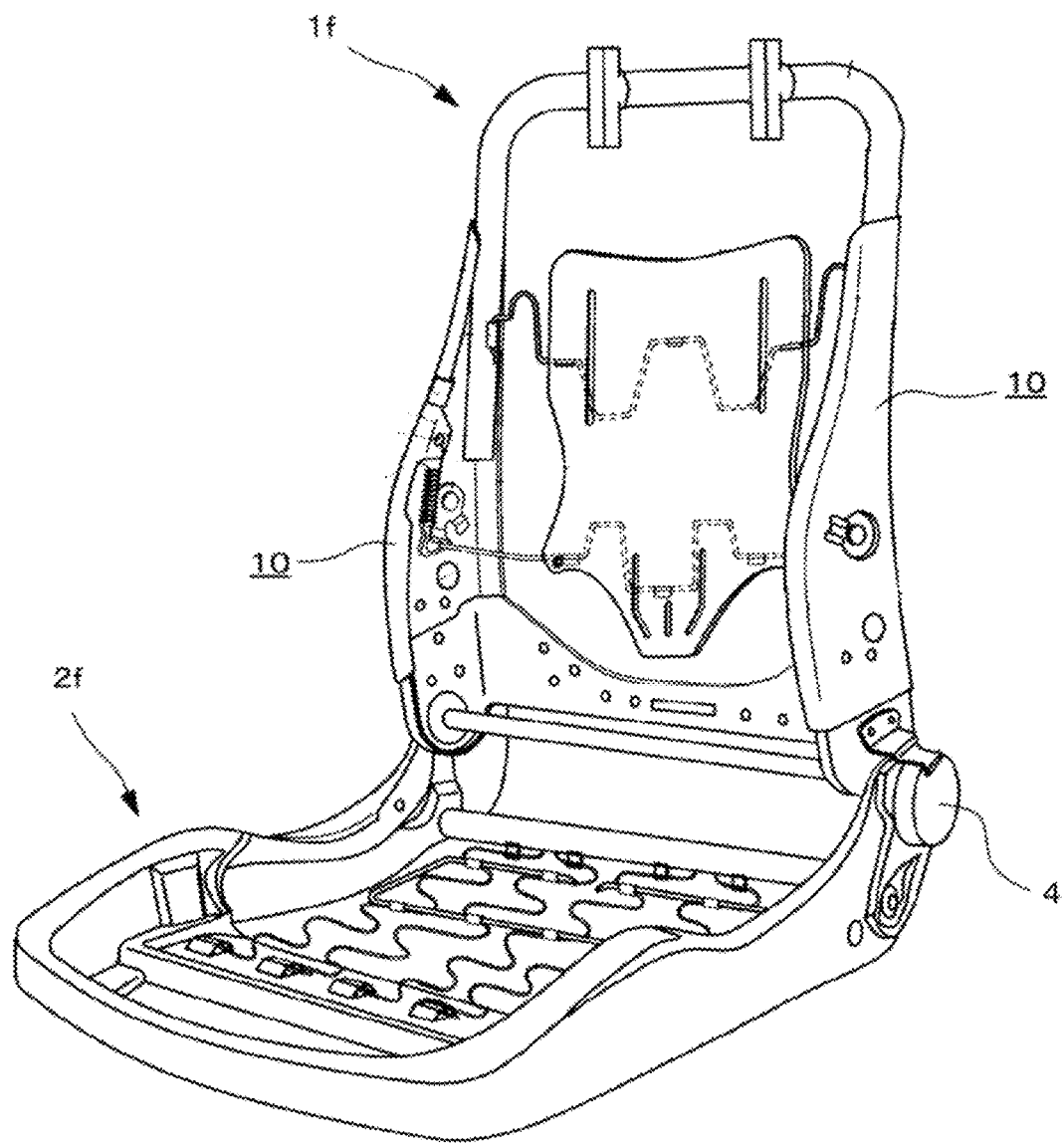

[FIG. 3]
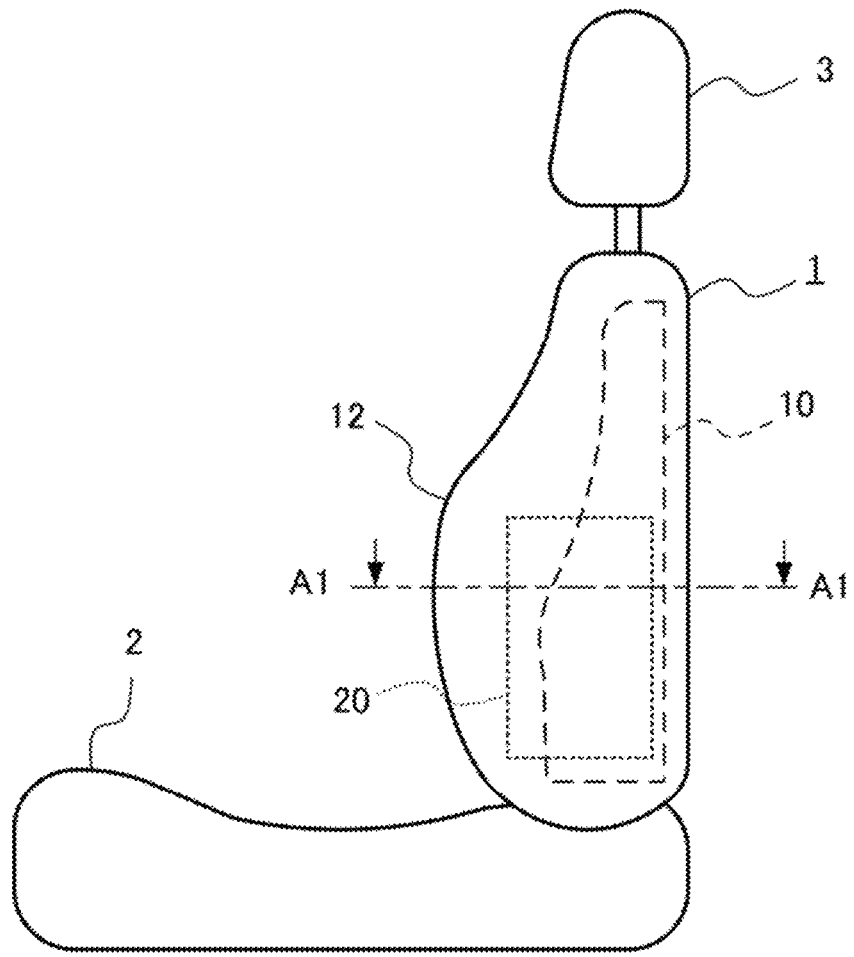
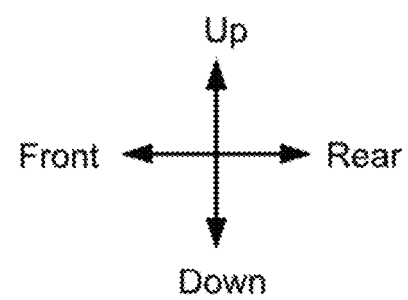

[FIG. 4]
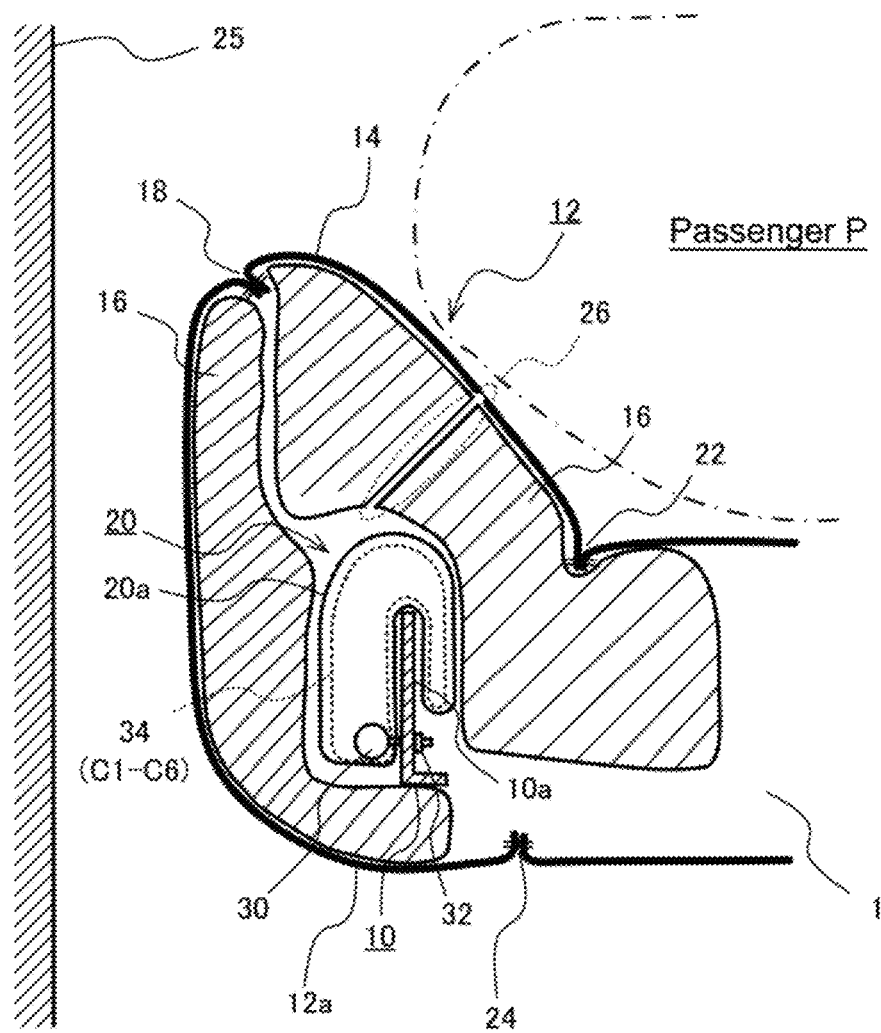
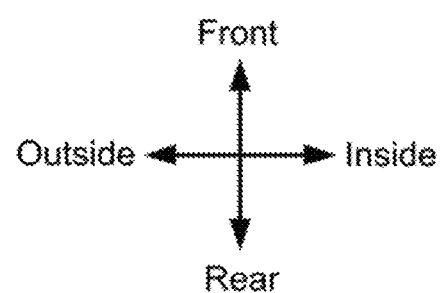

[FIG. 5]
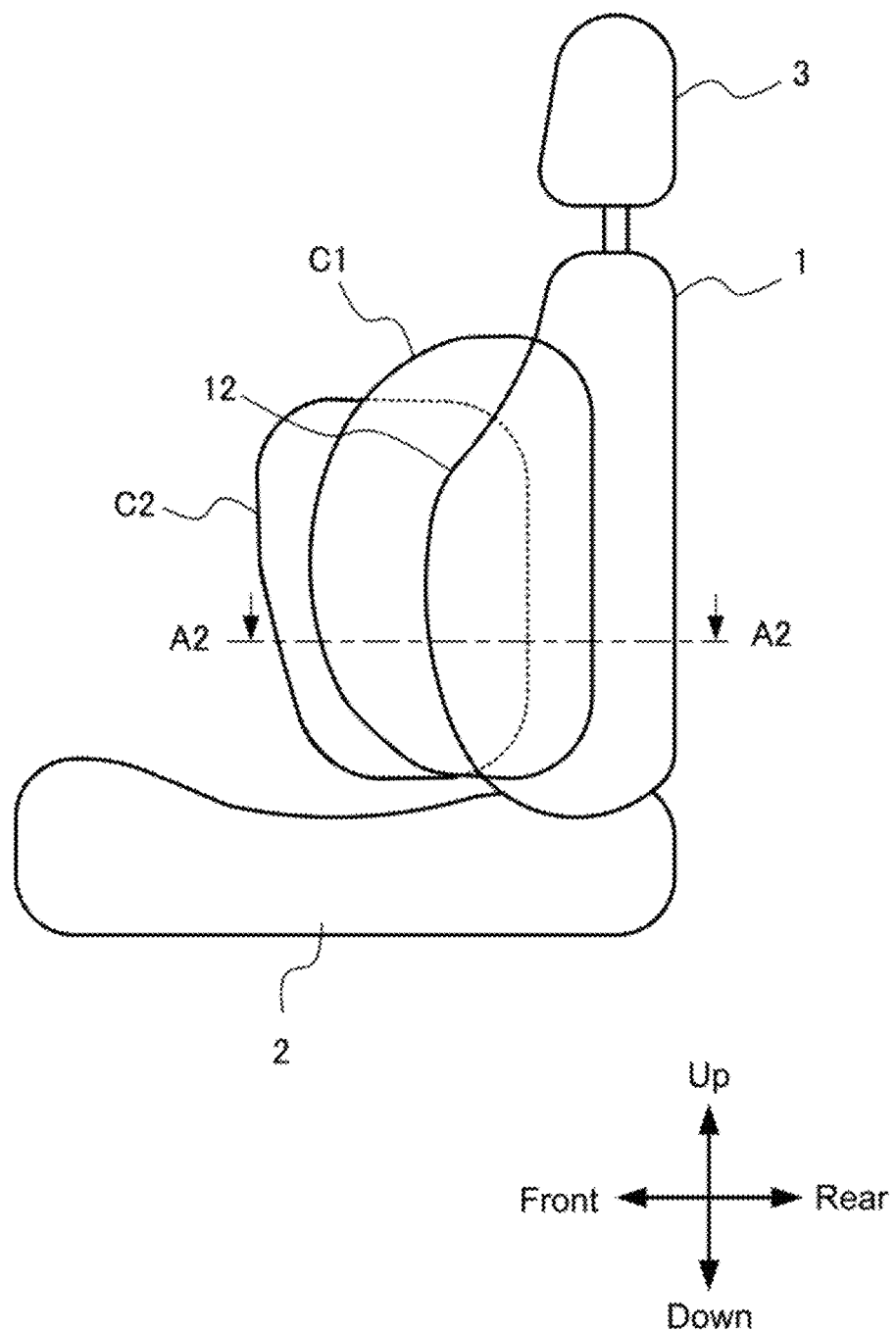

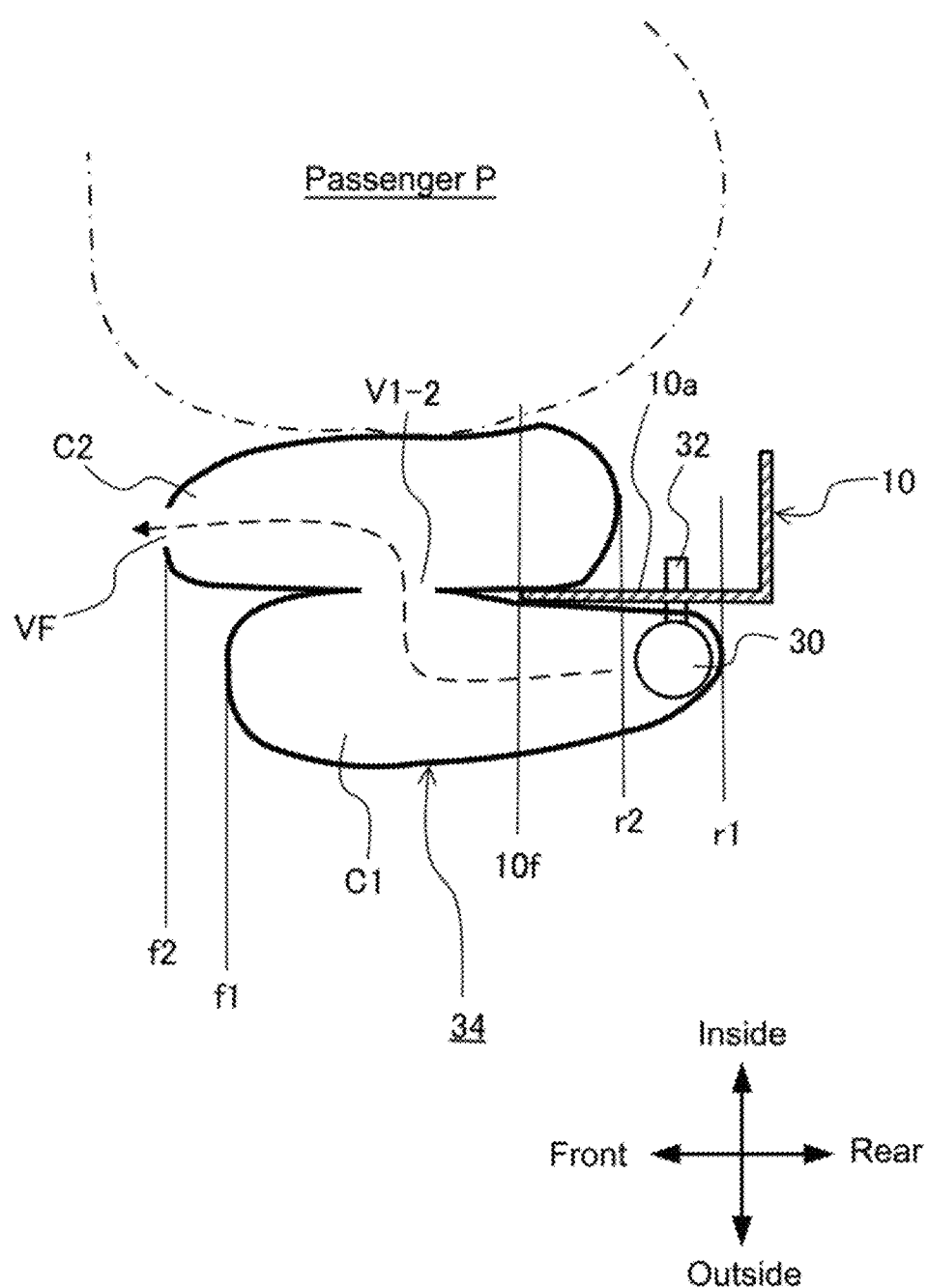

[FIG. 7]
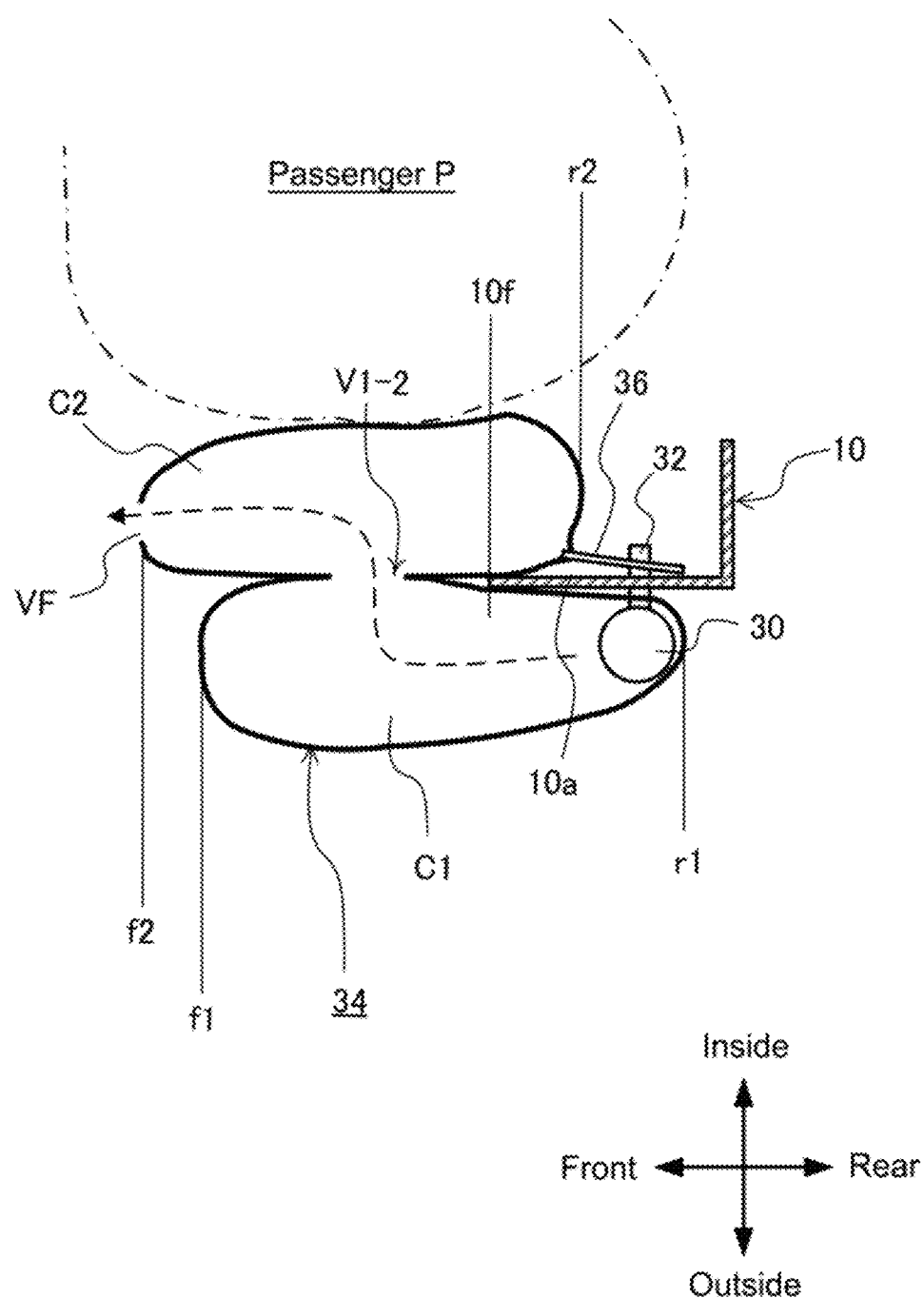

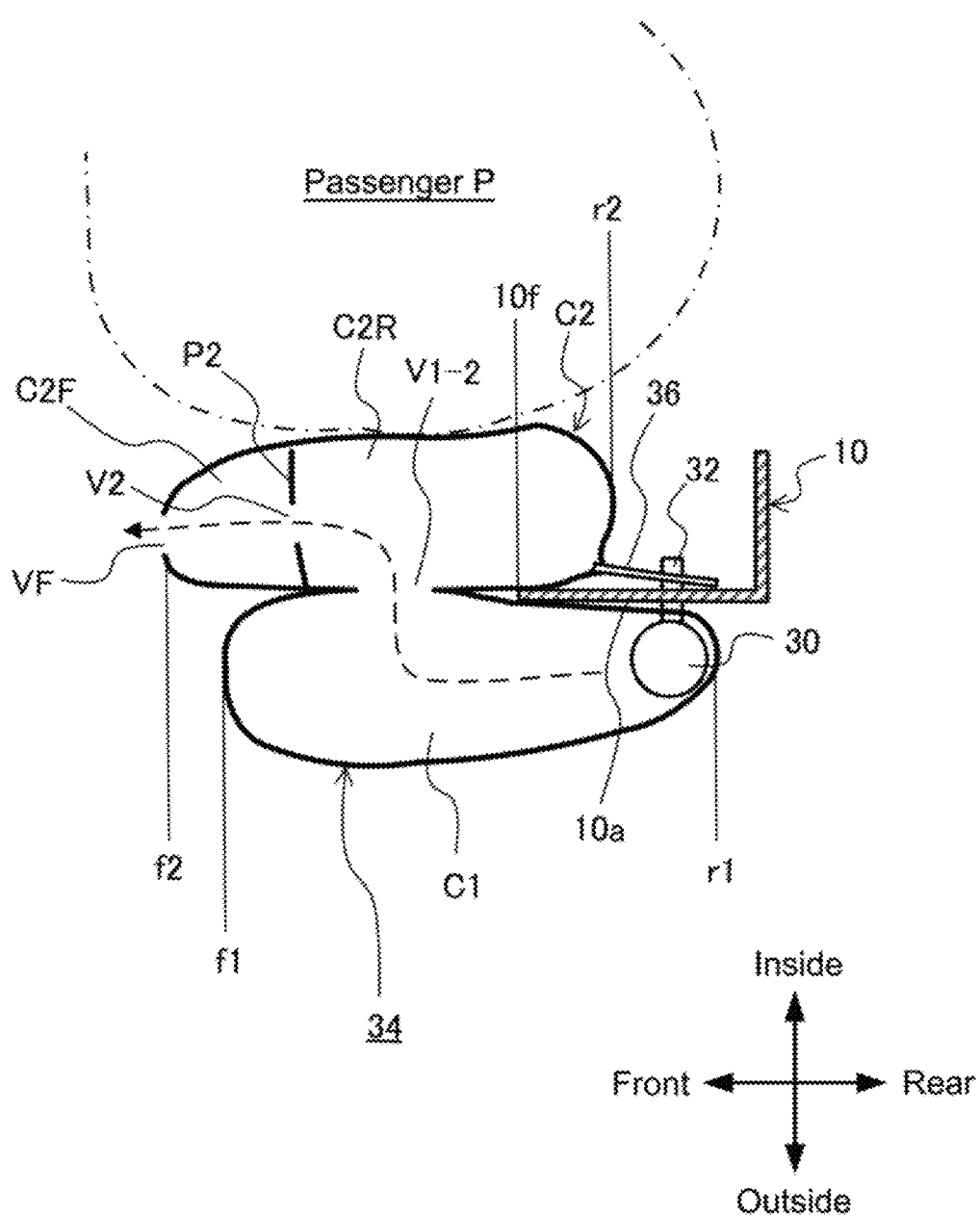

[FIG. 9]
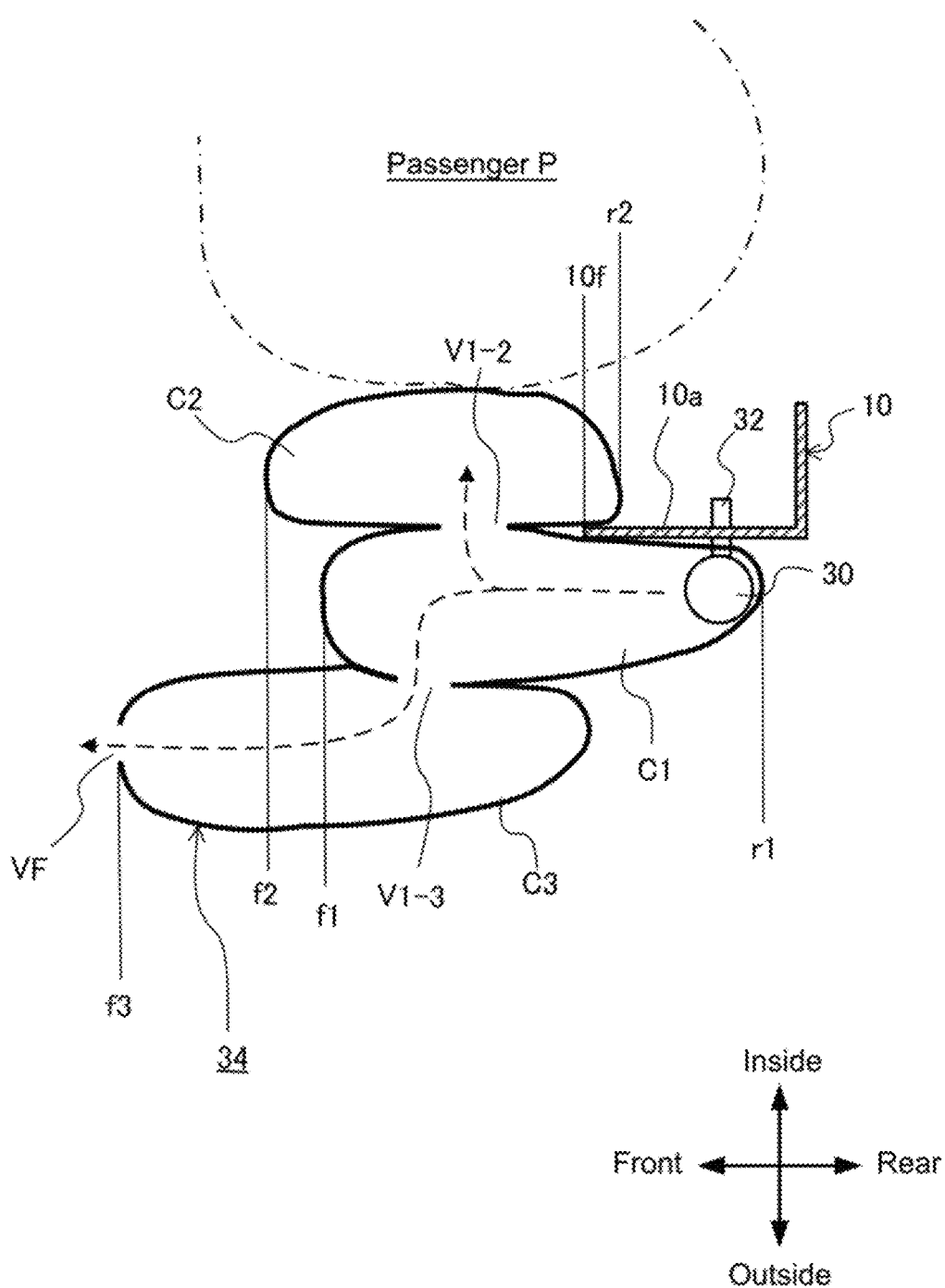

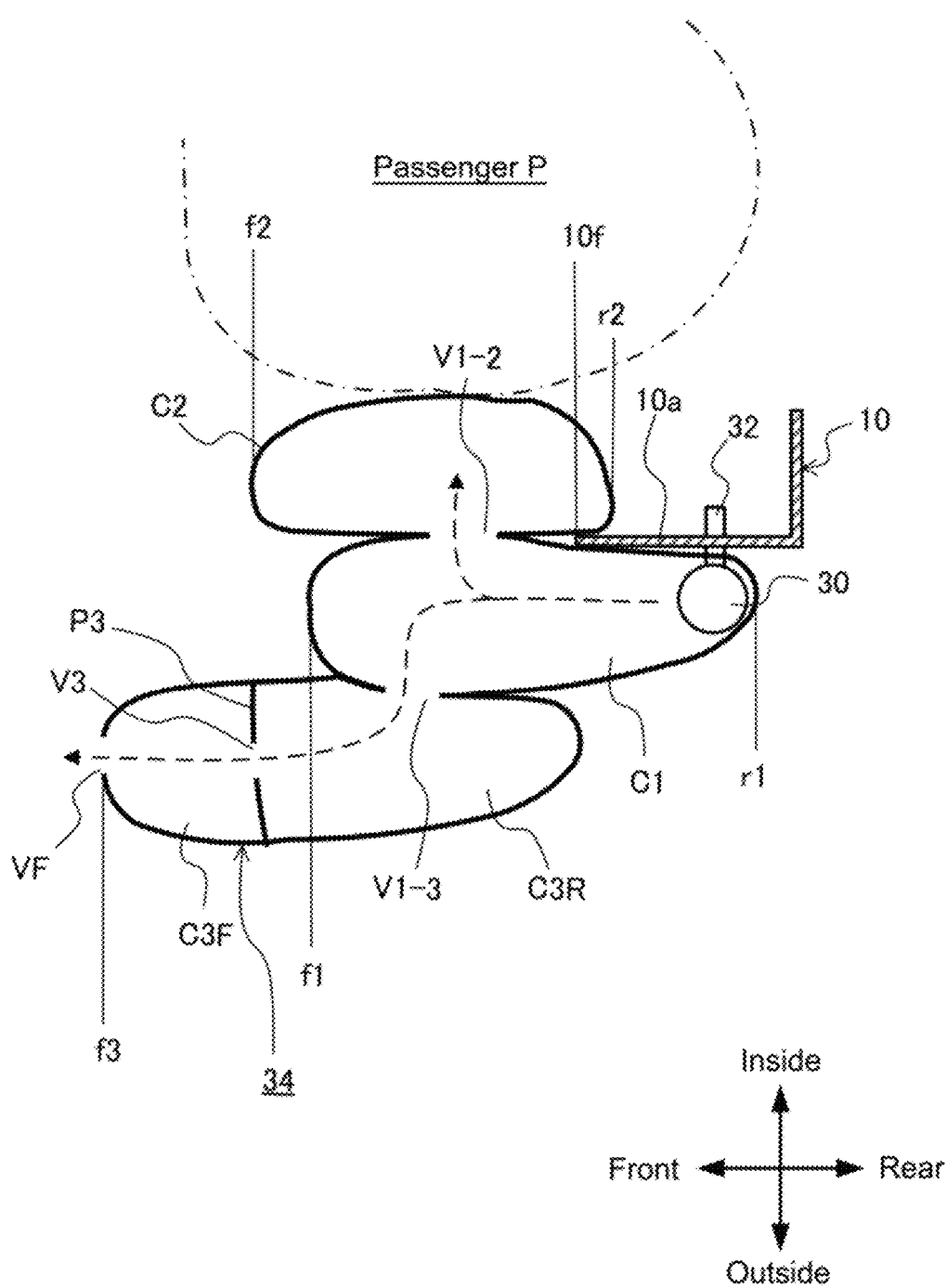

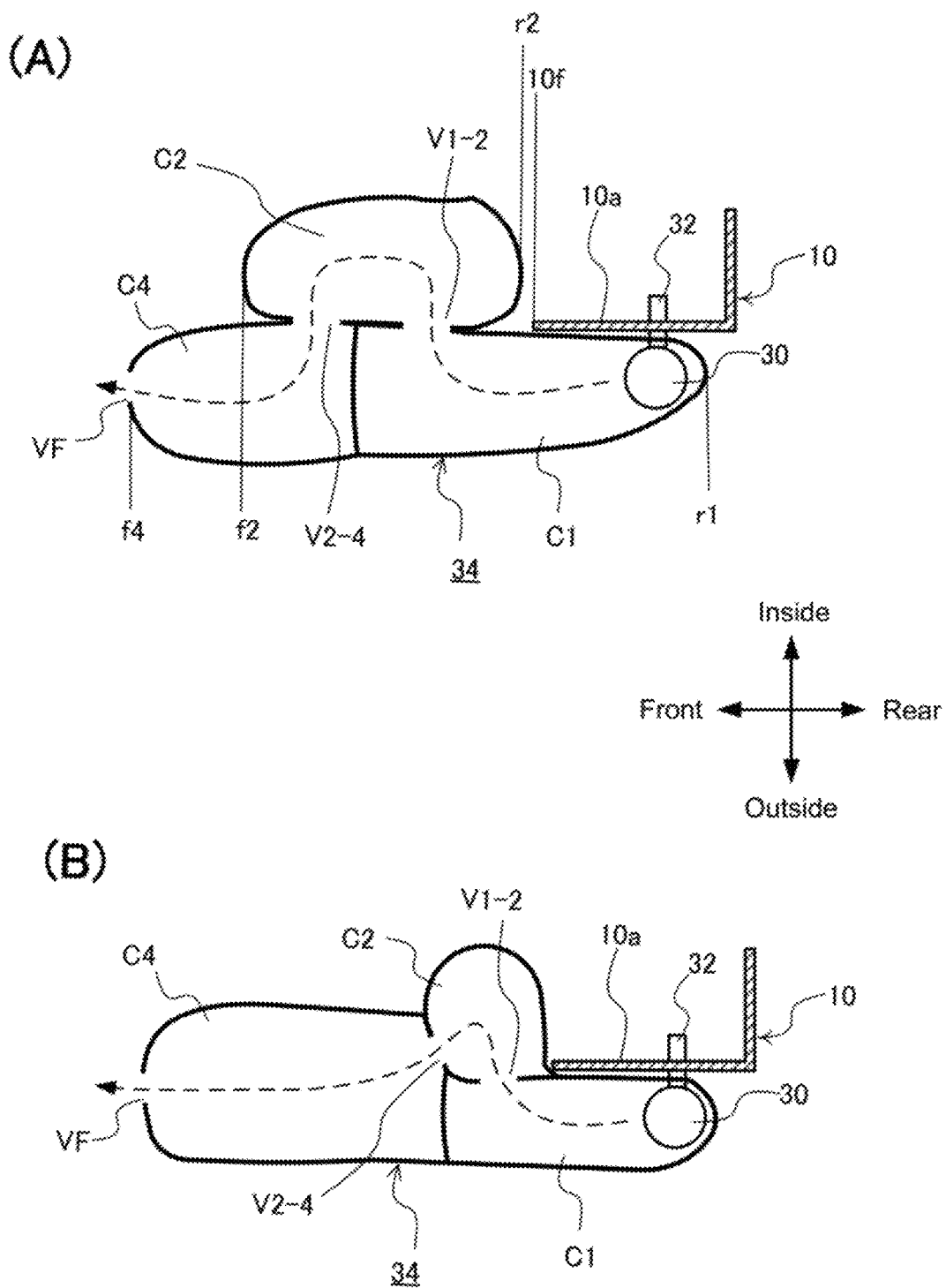
[FIG. 11]
Example 6
A2-A2 cross section

[FIG. 12]
Example 7
A2-A2 cross section
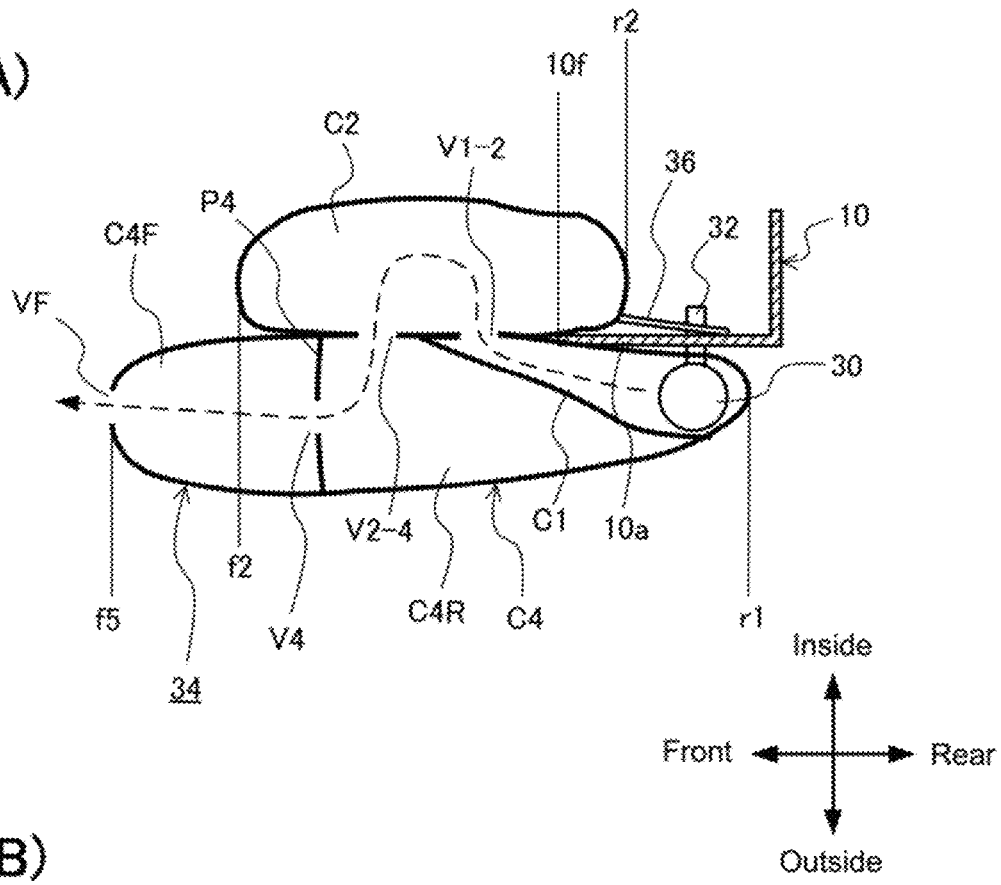
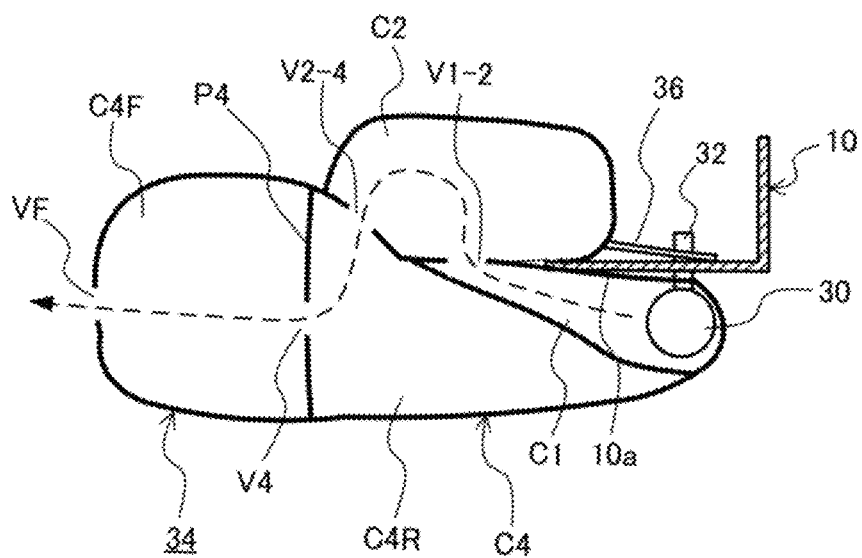

[FIG. 13]
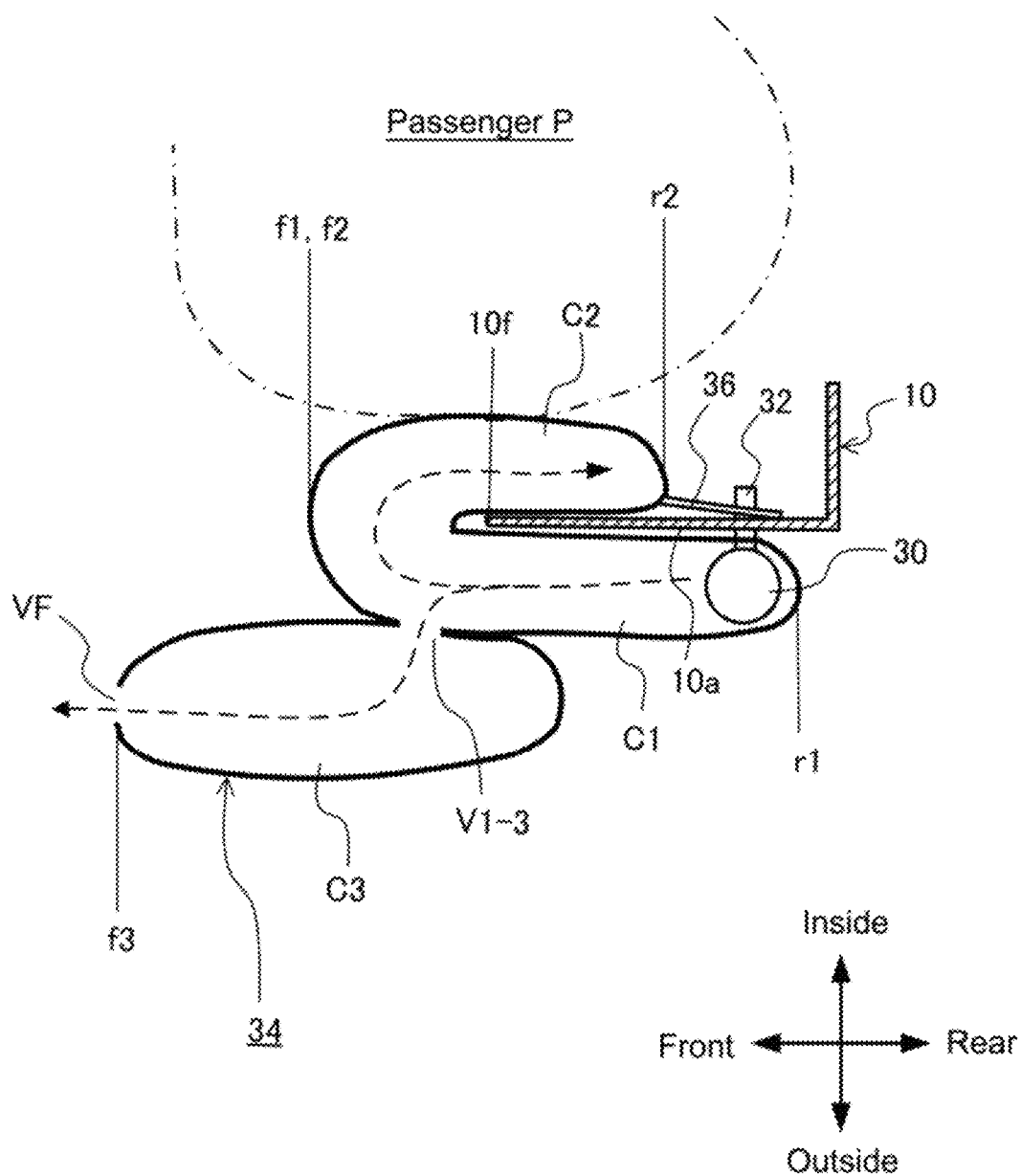

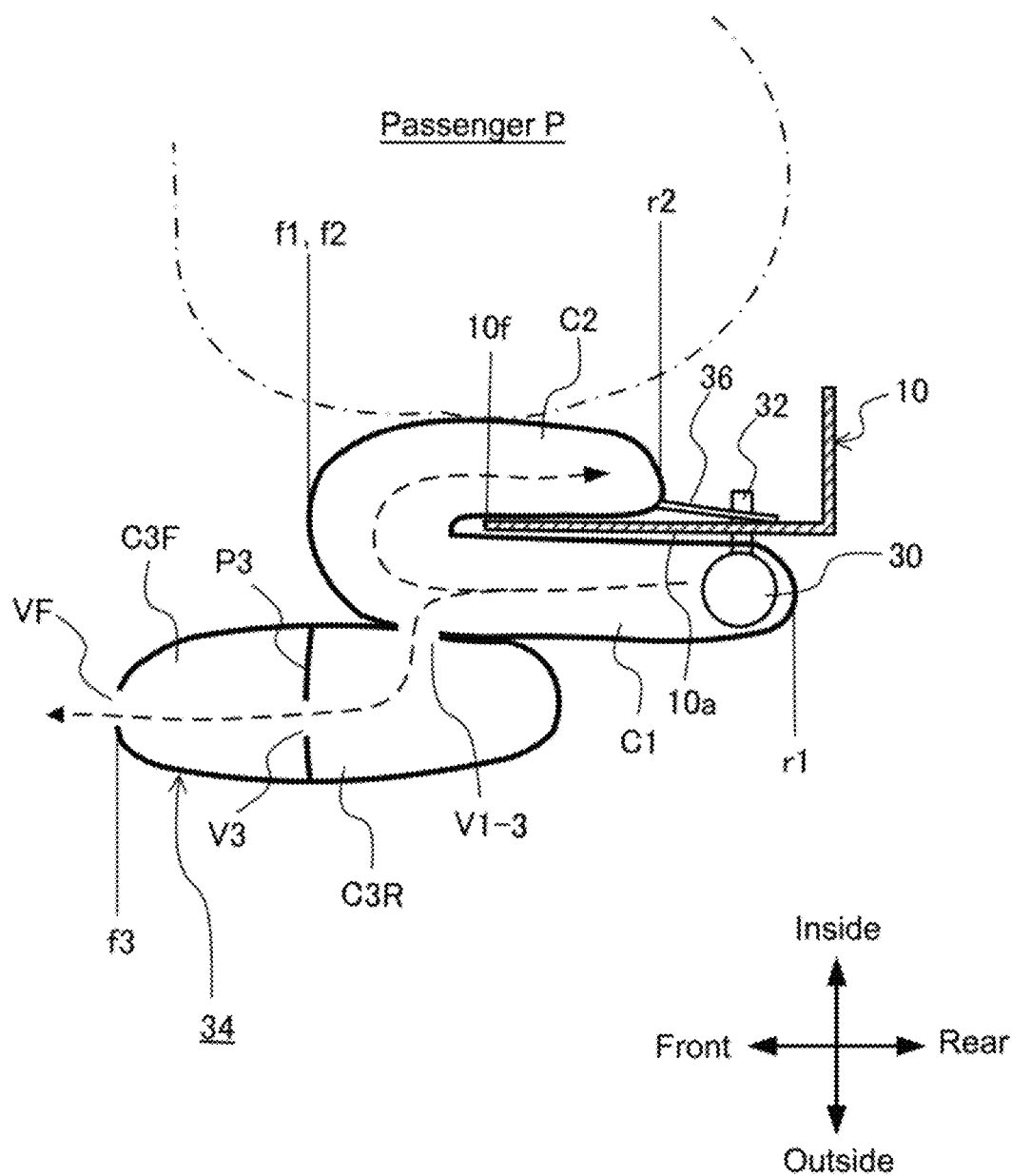

[FIG. 15]
Example 10
A2-A2 cross section
(A)
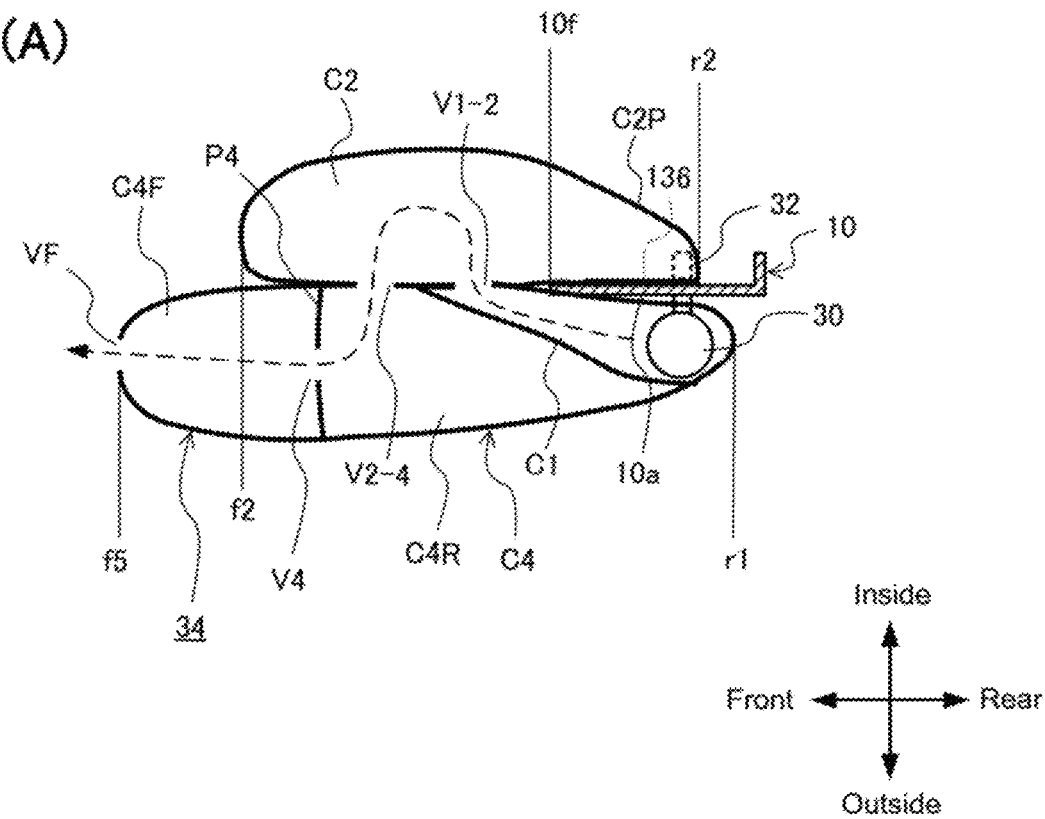
(B)
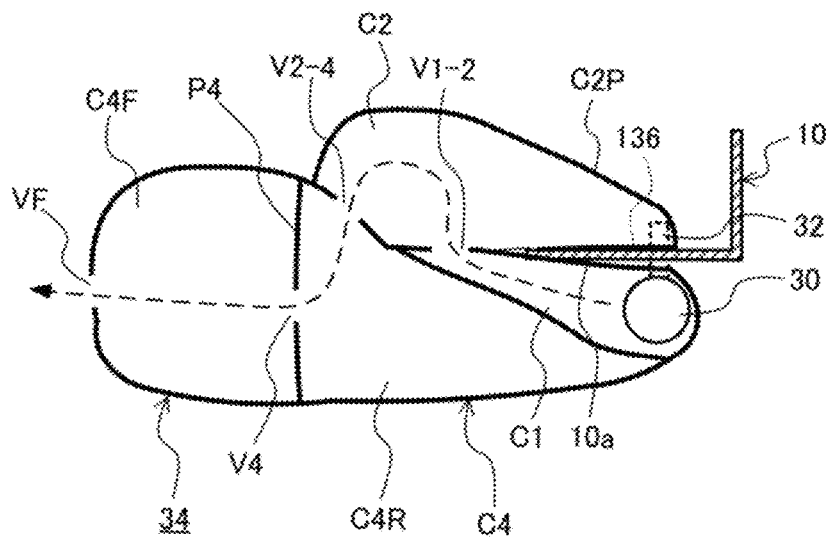

[FIG. 16]
(A)
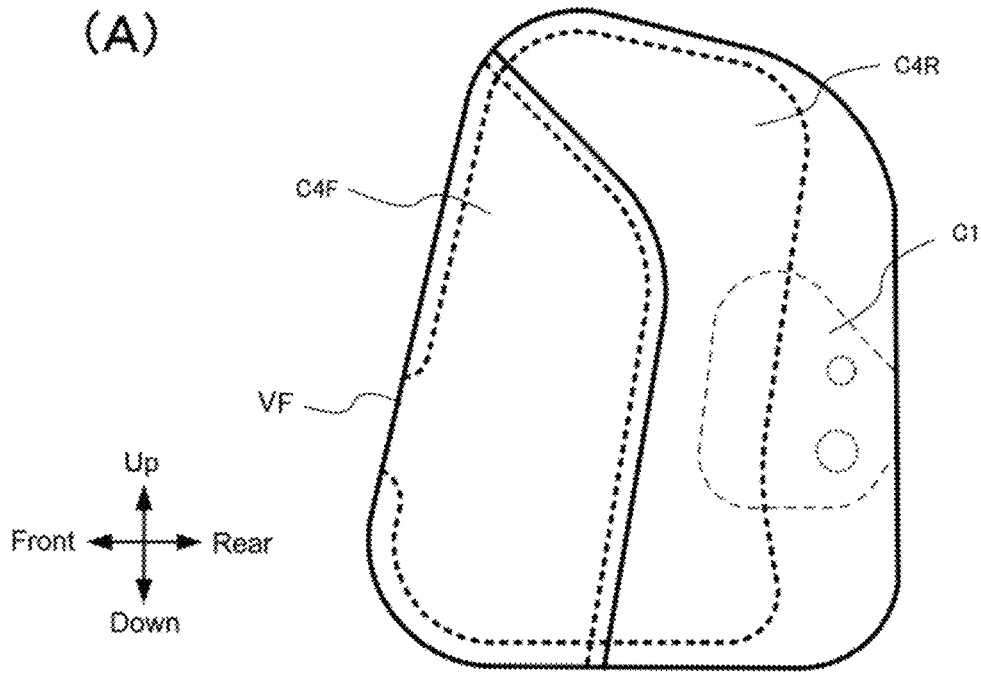
(B)
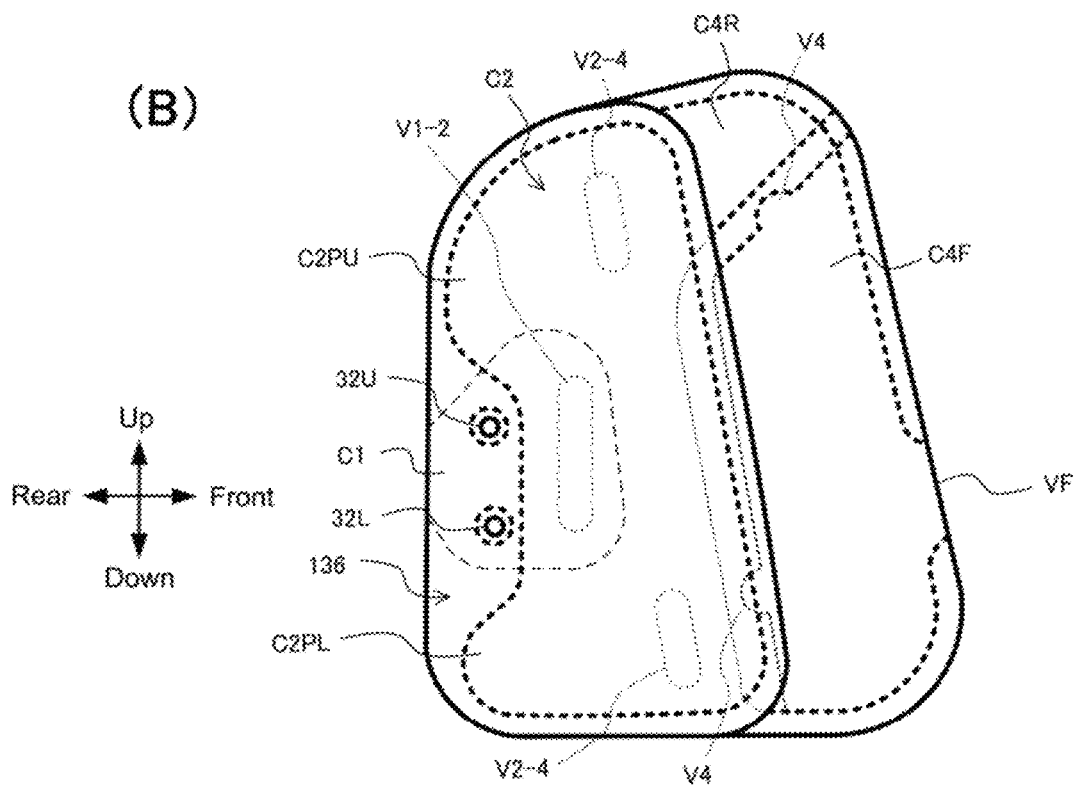

[FIG. 17]
Example 11
A2-A2 cross section
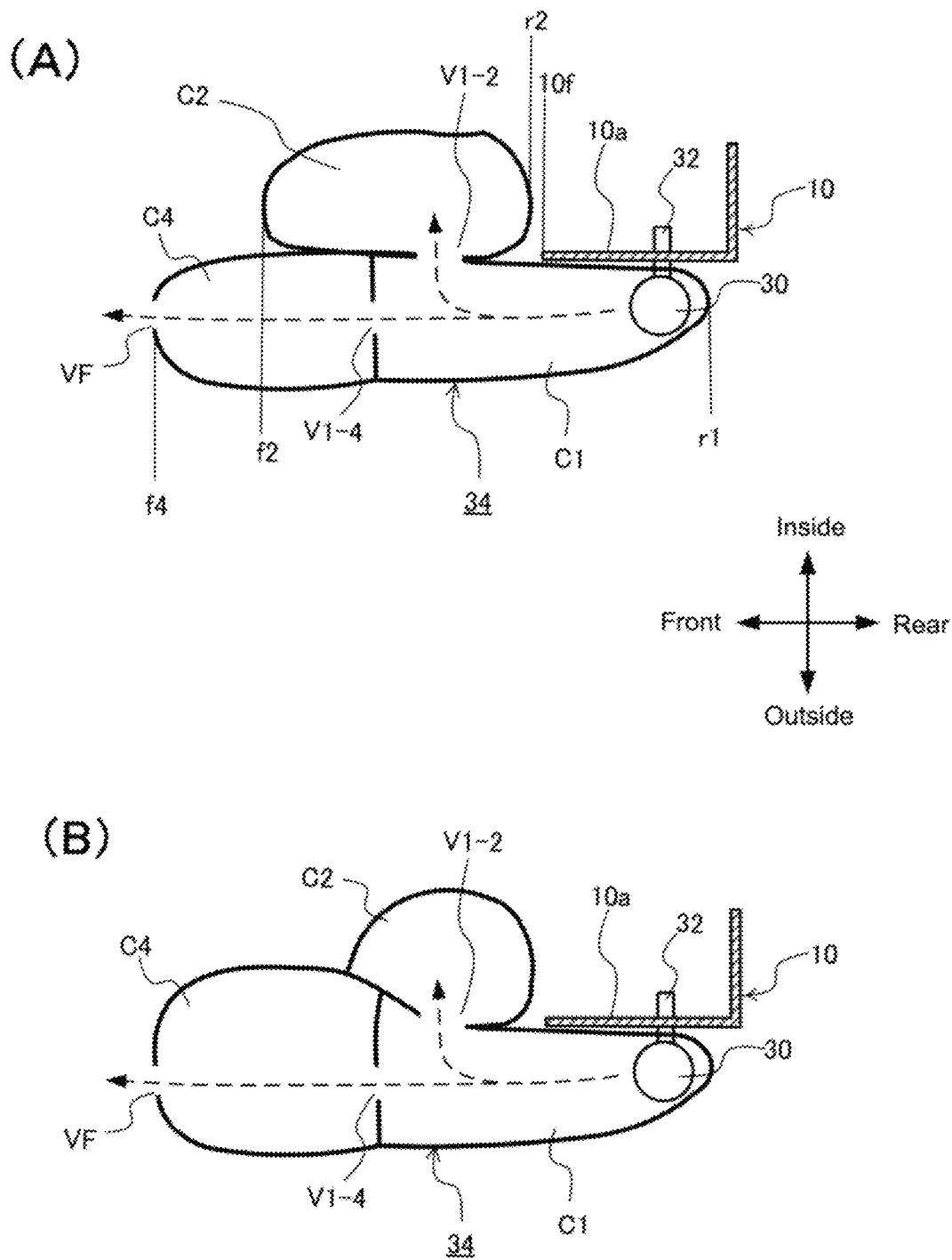

[FIG. 18]
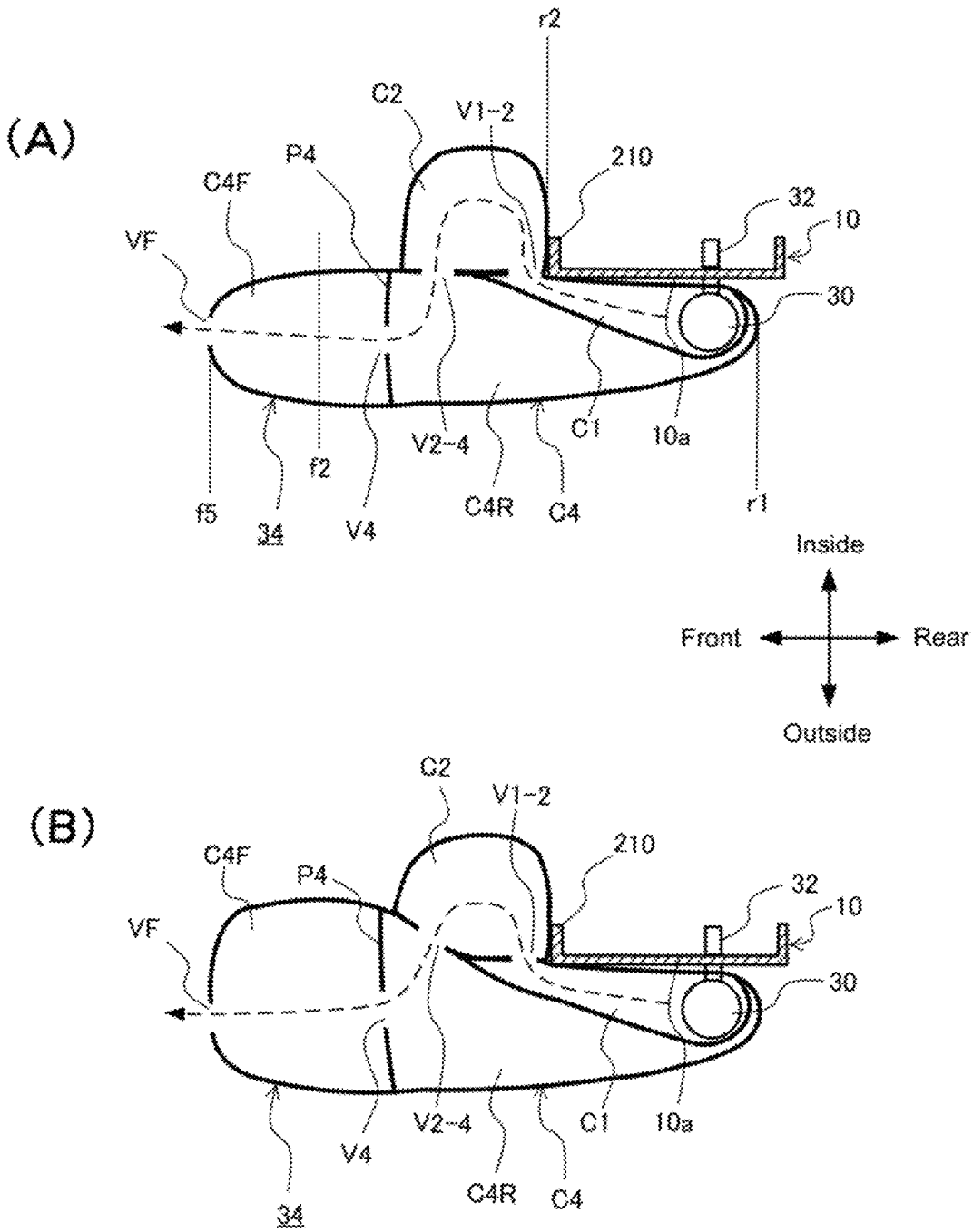

[FIG. 19]
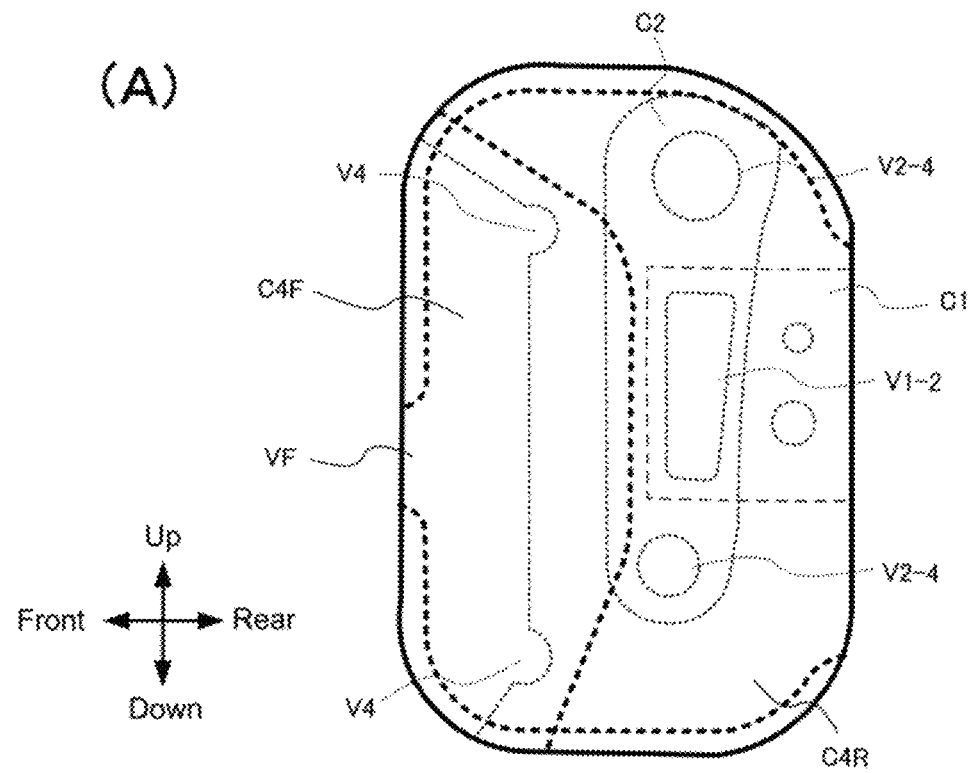
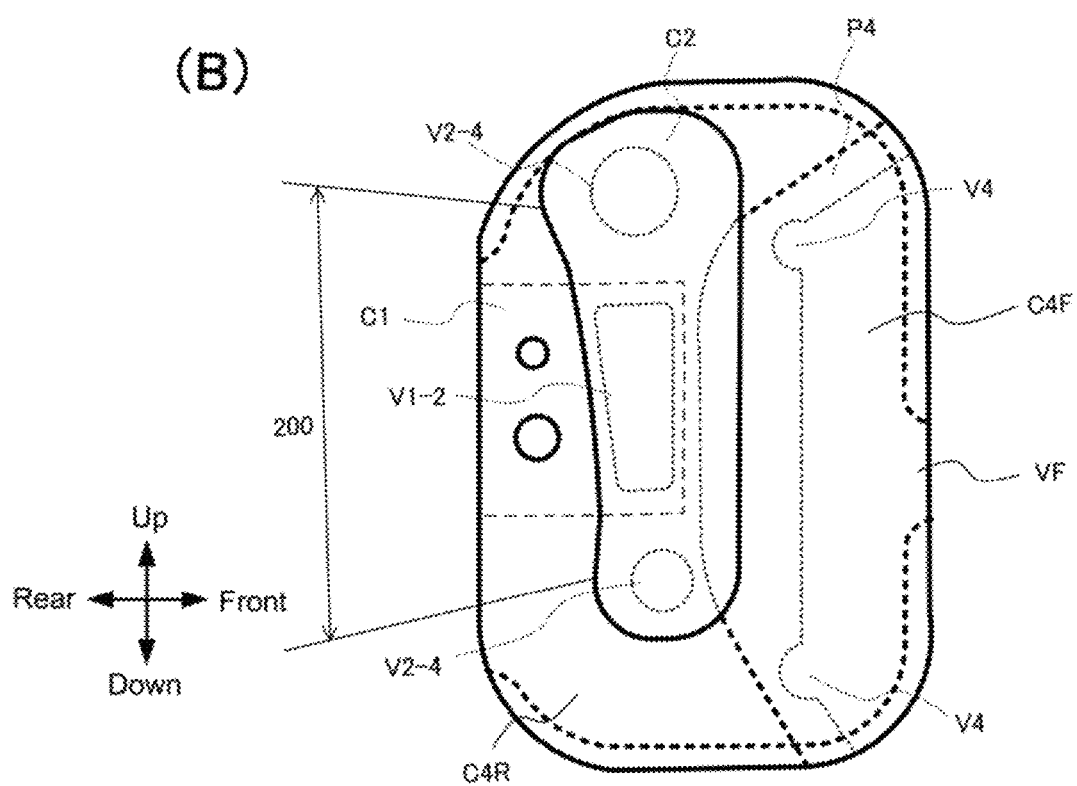

PASSENGER PROTECTION APPARATUS

TECHNICAL FIELD

The present invention relates to a passenger protection apparatus including a side airbag apparatus which protects passengers when deployed on the seat side of a vehicle.

BACKGROUND

In order to protect passengers when a vehicle accident occurs, it is well known that vehicles are equipped with one or more airbags. These airbags, for example, include various forms such as: a so-called driver airbag which is expanded from the vicinity of the steering wheel of an automobile so as protect the driver; a curtain airbag which is deployed downward inside the window of an automobile so as to protect passengers during collisions in the transverse direction of a vehicle, overturning, and rollover accidents; and a side airbag apparatus which is deployed on the side (seat side) of passengers so as to protect the passenger upon impact in the transverse direction of a vehicle. The present invention relates to a side airbag apparatus provided in a vehicle seat.

The side airbag apparatus described in the below mentioned Patent Document 1 includes a main airbag along with an auxiliary airbag. In addition, prior to the main airbag, the auxiliary airbag is expanded and deployed to restrain passengers at an early stage. In addition to the invention described in Patent Document 1, a side airbag apparatus including the auxiliary airbag as well as the main airbag is proposed. With such a side airbag apparatus, there is great restraint in the installation region, resulting in a strong demand for size reduction of the apparatus.

Moreover, there is a demand for appropriate passenger protection performance due to improved deployment speed and stabilization of the deployed shape.

RELATED ART DOCUMENTS

Patent Documents

[Patent Document 1] JP 2009-023494 A

SUMMARY OF THE INVENTION

Problem to be Solved by the Invention

The present invention has been created in view of the abovementioned problem, with an object of providing a passenger protection apparatus which includes a side airbag apparatus capable of quickly and properly restraining a passenger.

Moreover, another object is to provide a passenger protection apparatus including a side airbag apparatus which contributes to the size reduction of the apparatus.

Means for Solving the Problem

In order to achieve the abovementioned objects, the present invention is applied to a passenger protection apparatus, including: a vehicle seat having a seat cushion forming a seating face along with a seat back forming a backrest; and a side airbag apparatus housed in this seat.

Here, the seat back includes a side support part which swells in the vehicle traveling direction (vehicle front) on the vehicle width direction side (end).

A side frame part having a frame side wall part (which extends in the vehicle traveling direction when the horizontal cross section is seen from above) is arranged inside the side support part.

The side airbag apparatus includes: an airbag which restrains a passenger when expanded and deployed; and an inflator supplying expansion gas to the airbag.

The airbag includes: a first chamber which houses the inflator and is deployed outside in the vehicle width direction of the frame side wall part; and a second chamber which is deployed inside in the vehicle width direction of the frame side wall part.

In addition, the first chamber is deployed such that at least a portion thereof, as seen from the vehicle side, overlaps the frame side wall part. At this time, the rear end part of an expanding region of the second chamber, as seen from the vehicle side, is formed in front of the rear end part of the first chamber.

Note that the inside in the vehicle width direction of the frame side wall part denotes the center side (passenger side) of the seat, while the outside in the vehicle width direction of the frame side wall part denotes the outside (door side, center console side) in the transverse direction of the seat.

According to the present invention having the abovementioned configuration, the first chamber C1 is deployed outside the side support part in the initial stage of operating the airbag apparatus. At this time, because the first chamber is deployed so as to overlap the frame side wall part, as seen from the vehicle side, the first chamber is assuredly deployed such that the frame side wall part receives the reaction force of the first chamber. Subsequently, the second chamber is deployed so as to quickly restrain a passenger from moving to the outside in the vehicle width direction. At this time, the surface on the frame side of the second chamber is supported by both this frame side wall part and the first chamber (which has already started to be deployed) or only by the first chamber, with both the frame side wall part and the first chamber, or just the first chamber, receiving the reaction force when the second chamber is deployed. Therefore, when the passenger enters the second chamber, the pressure from the passenger can be received by the frame side wall part, making it possible to assuredly restrain the passenger in the seat center direction.

The first chamber and the second chamber can be provided so as to hold the frame side wall part.

Such a configuration allows the first chamber to be assuredly deployed outside in the vehicle width direction of the frame side wall part, in addition to allowing the second chamber to be assuredly deployed inside in the vehicle width direction of the frame side wall part, thereby easily controlling the deployed position of each chamber.

The second chamber can be deployed, as seen from the vehicle side, so as not to overlap the frame side wall part.

In this case, because the deployed position of the second chamber is shifted forward compared with the case of overlapping the frame side wall part, the shape of the overall airbag is advantageously more likely to be widened forward.

At least one first internal vent hole is preferably formed at the boundary part between the first chamber and the second chamber such that the gas inside the first chamber flows into the second chamber.

The presence of the first internal vent hole allows the expansion gas to be quickly filled into the overall airbag.

The first chamber and the second chamber can be configured as a single chamber.

In this case, the number of panels constituting the airbag can be decreased to simplify the overall panel structure.

The second chamber can be sectioned into a front chamber part and a rear chamber part, wherein at least one second internal vent hole can be provided in this section part.

The front end part of the second chamber can be disposed in front of the front end part of the first chamber.

In this way, when the front end of the second chamber on the side near the passenger moves forward, for example, a passenger who is seated while bent forward can be restrained, enabling the restraint range of the passenger to be widened.

The passenger protection apparatus can further include a third chamber coupled to this first chamber on the side of the first chamber opposite the second chamber.

By employing such a configuration, compared with the case in which a wide range is protected with a single chamber, the deploying behavior of the airbag is more likely to be perceived, enabling the deployed shape and deployed position of the airbag to be accurately controlled.

Here, at least one third internal vent hole can be formed at the boundary part between the first chamber and the third chamber such that the gas inside the first chamber flows into the third chamber.

In this case, the expansion gas branched from the first chamber is separately fed into the second chamber and the third chamber, respectively, thereby contributing to the quick deployment of the second chamber and the third chamber.

Moreover, the front end part of the third chamber can be configured so as to be disposed in front of the front end parts of the first chamber and the second chamber.

In this case, when seen as the deployed shape of the overall airbag, the width in the anteroposterior direction can be relatively easily increased.

Further, the third chamber can be sectioned into a front chamber part and a rear chamber part, wherein at least one fourth internal vent hole can be provided in this section part. As a result, the width in the anteroposterior direction can be further increased.

The passenger protection apparatus can further include a fourth chamber coupled to the side face of the second chamber in front of the first chamber.

In addition, at least one fifth internal vent hole can be formed at the boundary part between the second chamber and the fourth chamber such that the gas inside the second chamber flows into the fourth chamber.

By employing such a configuration, because the expansion gas flows in the order of the first chamber, the second chamber, and the fourth chamber, and is expanded and deployed in this order, the passenger can be quickly restrained by the first and second chambers in an early stage, allowing the restraint range to be widely assured by the fourth chamber.

Alternatively, at least one sixth vent hole can be formed at the boundary part between the fourth chamber and the first chamber such that the gas inside the first chamber flows into the fourth chamber.

Moreover, the rear part of the fourth chamber can be provided outside the side frame so as to cover the outside in the vehicle width direction of the second chamber, such that the first chamber can function as a gas guide to the second chamber.

The rear part of the fourth chamber can be provided outside the side frame so as to cover the outside in the vehicle width direction of the first chamber, while the first chamber can be provided as a gas guide to the second chamber.

The passenger protection apparatus further includes a fourth chamber coupled to the outside in the vehicle width direction of the side face of the second chamber, wherein the first chamber can be provided inside the fourth chamber in a bag-in bag-out form.

Here, the fourth chamber can be provided so as to be disposed on the front side of the side frame part. Moreover, at least one fifth internal vent hole is preferably formed at the boundary part between the second chamber and the fourth chamber such that the gas inside the second chamber flows into the fourth chamber.

The front end part of the fourth chamber can be configured so as to be disposed in front of the front end part of the second chamber. Here, the fourth chamber can be configured so as to be coupled to the front end of the first chamber and the side face of the second chamber.

A protruding expanding part which protrudes rearward so as to be expanded and deployed can be formed in a portion of the second chamber. Here, the protruding expanding part of the second chamber is preferably formed in a configuration so as not to overlap the inflator, as seen from the side.

Normally, the rear part of the second chamber overlaps the space for attaching the inflator, necessitating that the rear end of the second chamber be arranged in front of the inflator. However, by forming the abovementioned protruding expanding part, the second chamber can be extended more rearward than the inflator (stud bolt). As a result, the second chamber can be sufficiently overlapped with the side frame, while the reaction force from the side frame can be utilized when the air bag is expanded and deployed, enabling deployment with a stable behavior and position.

In each chamber constituting the airbag, an external vent hole for discharging the expansion gas to the outside can be provided at the tip of the frontmost chamber.

The passenger protection apparatus further includes a strap having the front end coupled to the rear side of the second chamber, wherein the rear end of the strap can be configured so as to be coupled to a stud bolt for attaching the side frame or the inflator to the side frame. Alternatively, while a non-expanding region can be configured so as to be formed in the rear of the expanding region of the second chamber, this non-expanding region can be configured so as to be coupled to the stud bolt for attaching the side frame or the inflator to the side frame.

In this case, the deploying behavior, deployed shape, and deployed position in the anteroposterior direction of the second chamber can be controlled.

(Embodiments of the Present Invention)

The side airbag apparatus according to the present invention includes a type which is deployed on the door side of (outside) the seat, along with a type which is deployed on the vehicle center side of the seat. Note that a side airbag apparatus of a type which is deployed on the vehicle center side of the seat, for example, is referred to as a far side airbag apparatus, front center airbag, rear center airbag, etc.

BRIEF DESCRIPTION OF THE DRAWINGS

FIG. 1 is a perspective view mainly illustrating the external shape of a vehicle seat used for a passenger protection apparatus according to the present invention, with an illustration of the airbag unit omitted.

FIG. 2 is a perspective view illustrating an internal structure (seat frame) functioning as the framework of the vehicle seat illustrated in FIG. 1, with an illustration of the airbag unit omitted.

FIG. 3 is a schematic side view of the passenger protection apparatus according to the present invention and illustrates the state in which the airbag unit housed therein is observed from the outside in the vehicle width direction.

FIG. 4 is a cross sectional view illustrating the structure of the passenger protection apparatus according to the present invention, corresponding to part of the cross section in the A1-A1 direction of FIG. 3.

FIG. 5 is a schematic side view of the passenger protection apparatus according to the present invention and illustrates the state in which the airbag deployed therein is observed from the outside in the vehicle width direction.

FIG. 6 is a schematic view illustrating the deployed state of an airbag apparatus according to Example 1 of the present invention, corresponding to the cross section in the A2-A2 direction of FIG. 3.

FIG. 7 is a schematic view illustrating the deployed state of an airbag apparatus according to Example 2 of the present invention, corresponding to the cross section in the A2-A2 direction of FIG. 3.

FIG. 8 is a schematic view illustrating the deployed state of an airbag apparatus according to Example 3 of the present invention, corresponding to the cross section in the A2-A2 direction of FIG. 3.

FIG. 9 is a schematic view illustrating the deployed state of an airbag apparatus according to Example 4 of the present invention, corresponding to the cross section in the A2-A2 direction of FIG. 3.

FIG. 10 is a schematic view illustrating the deployed state of an airbag apparatus according to Example 5 of the present invention, corresponding to the cross section in the A2-A2 direction of FIG. 3.

FIGS. 11(A), (B) are schematic views illustrating the deployed state of an airbag apparatus according to Example 6 of the present invention, corresponding to the cross section in the A2-A2 direction of FIG. 3.

FIGS. 12(A), (B) are schematic views illustrating the deployed state of an airbag apparatus according to Example 7 of the present invention, corresponding to the cross section in the A2-A2 direction of FIG. 3.

FIG. 13 is a schematic view illustrating the deployed state of an airbag apparatus according to Example 8 of the present invention, corresponding to the cross section in the A2-A2 direction of FIG. 3.

FIG. 14 is a schematic view illustrating the deployed state of an airbag apparatus according to Example 9 of the present invention, corresponding to the cross section in the A2-A2 direction of FIG. 3.

FIGS. 15(A), (B) are schematic views illustrating the deployed state of an airbag apparatus according to Example 10 of the present invention, corresponding to the cross section in the A2-A2 direction of FIG. 3.

FIG. 16 is a side view illustrating the deployed state of the airbag apparatus illustrated in FIG. 15, in addition to illustrating the configuration and shape of panels constituting the airbag.

FIGS. 17(A), (B) are schematic views illustrating the deployed state of an airbag apparatus according to Example 11 of the present invention, corresponding to the cross section in the A2-A2 direction of FIG. 3.

FIGS. 18(A), (B) are schematic views illustrating the deployed state of an airbag apparatus according to Example 12 of the present invention, corresponding to the cross section in the A2-A2 direction of FIG. 3.

FIG. 19 is a side view illustrating the deployed state of the airbag apparatus illustrated in FIG. 18, in addition to illustrating the configuration and shape of panels constituting the airbag.

DESCRIPTION OF THE PREFERRED EMBODIMENT

A vehicle seat with a side airbag apparatus according to embodiments of the present invention mounted thereon will be described with reference to the accompanying drawings. Note that "front" displayed in each figure denotes the front (traveling direction) of a vehicle, "rear" denotes the rear (on the side opposite the traveling direction) of the vehicle, "inside" denotes the inside in the vehicle width direction (on the passenger side), and "outside" denotes the outside in the vehicle width direction (on the door panel side).

FIG. 1 is a perspective view mainly illustrating the external shape of a vehicle seat used for a passenger protection apparatus according to Example 1 of the present invention, with an illustration of the airbag apparatus (20) omitted. FIG. 2 is a perspective view illustrating an internal structure (seat frame) functioning as the framework of the vehicle seat illustrated in FIG. 1, with an illustration of the airbag apparatus (20) also omitted here. FIG. 3 is a schematic side view of the passenger protection apparatus according to Example 1, in addition to illustrating the state in which the airbag apparatus 20 housed therein on the side face (near side) near the door of the vehicle seat is observed from the outside in the vehicle width direction.

The present invention is a passenger protection apparatus including: a vehicle seat; and a side airbag apparatus (20) housed in this seat. As illustrated in FIGS. 1 and 2, seen as the location, the vehicle seat according to the present example is configured by: a seat cushion 2 of the part on which a passenger is seated; a seat back 1 forming a backrest; and a headrest 3 coupled to the upper end of the seat back 1.

A seat back frame 1*f* forming the skeleton of the seat is provided inside the seat back 1, a pad made of a urethane foam material, etc. is provided on the surface and periphery thereof, and the surface of this pad is covered with a skin 14 such as leather or fabric. A seating frame 2*f* is arranged on the bottom side of the seat cushion 2, a pad made of a urethane foam material, etc. is provided on the upper surface and periphery thereof, and this pad surface is covered with the skin 14 (FIG. 4) such as leather or fabric. The seating frame 2*f* and the seat back frame 1*f* are coupled via a reclining mechanism 4.

As illustrated in FIG. 2, the seat back frame 1*f* is configured in a frame shape by: a side frame 10 which is arranged so as to be separated into the left and right and extends in the vertical direction; an upper frame coupled to the upper end of this side frame 10; and a lower frame coupled to the lower end thereof. A cushion member is provided outside a headrest frame to configure the headrest 3.

FIG. 4 is a cross sectional view illustrating the structure of the passenger protection apparatus according to the present invention, corresponding to part of the cross section in the A1-A1 direction of FIG. 3. FIG. 5 is a schematic side view of the passenger protection apparatus according to the present invention and illustrates the state in which the airbag deployed therein is observed from the outside in the vehicle width direction.

The side frame 10 can be molded of resin or metal and, as illustrated in FIG. 4, can be formed into an L shaped cross sectional shape or a U shaped cross sectional shape. The side frame 10 includes a frame side wall part 10a which extends in the vehicle traveling direction when the horizontal cross section is seen from above. In addition, an airbag module (side airbag apparatus) 20 is fixed to the outside in the vehicle width direction of this frame side wall part 10a.

As illustrated in FIG. 4, the seat back 1 includes a side support part 12 which swells in the vehicle traveling direction (vehicle front) on the vehicle width direction side (end). Inside the side support part 12, the side airbag apparatus 20 is housed in a gap with a urethane pad 16 not arranged therein. The side airbag apparatus 20 includes: an airbag 34 for restraining a passenger when expanded and deployed; and an inflator 30 for supplying expansion gas to the airbag 34.

Seams 18, 22, 24 of the skin 14 of the seat back 1 are interwoven and coupled by sewing. Note that the front seam 18 is cleft when the airbag is deployed.

Moreover, a start region 26 as a starting point (when the side support part 12 bends towards the passenger side due to the expansion of a second chamber (C2)) is formed in the side support part 12. The start region 26 can be any one of a notch, recess, or thin region, or combinations thereof. The start region 26 only needs to be formed at a urethane 16 part inside the side support part 12.

Moreover, the start region 26 can be omitted.

The airbag 34 is covered with a flexible cover 20a made of fabric. The airbag 34, for example, can appropriately employ folding or rolling in bellows ("folding" includes rolling), in addition to an appropriate compression method. In FIG. 4, the symbol 25 denotes a door trim. As will be described later in detail, in the storage state in which the airbag 34 is folded, in order to maintain the positional relationship when the airbag is expanded and deployed, the first chamber (C1) side on which the inflator 30 is housed is disposed outside in the vehicle width direction of the frame side wall part 10a, while the second chamber (C2) coupled to this first chamber (C1) is arranged inside in the vehicle width direction of the frame side wall part 10a.

As illustrated in FIG. 5, the airbag 34 includes: the first chamber C1 which is deployed towards the front of the side support part 12; and the second chamber C2 which is deployed inside in the vehicle width direction of the first chamber C1.

The second chamber C2 is deformed so as to make at least the front side part 14 of the side support part 12 protrude towards the passenger. Moreover, the second chamber C2 is arranged below the side support part 12 (see FIG. 5), while this second chamber C2 is deployed so as to contact and press the side support part 12 with the waist part of the passenger. By pushing the waist part close to the center of gravity of the human body, the restraint performance of a passenger in the initial stage when an accident occurs can be improved. The capacity of the second chamber C2 is set to be smaller than the capacity of the first chamber C1.

Note that the shape and capacity of the second chamber C2 may be adjusted such that the second chamber C2 may only be deployed inside the side support part 12. In other words, the deployed second chamber C2 may not stick out to the vehicle front compared with the front end of the cleft side support part 12. Moreover, the deploying behavior of the first chamber C1 and the second chamber C2 can be adjusted by a method of folding the airbag, the configuration of the folded airbag 34, the setting of the gas jet direction of the inflator 30, the direction of the gas flow between the first chamber C1 and the second chamber C2, etc.

REFERENCE NUMERALS

While examples according to the present invention will hereinafter be described, reference symbols are provided based on a predetermined rule in the accompanying drawings for convenience and will be initially described regarding this point.

While chambers constituting the airbag are defined as C1 to C6 substantially along the flow of the expansion gas, a portion thereof do not necessarily coincide with the flow of the gas. Moreover, if one chamber is divided into the front and rear, the front chamber part is labeled "F," while the rear chamber part is labeled "R." For example, if the second chamber C2 is divided into the two parts of the front and rear, the front chamber part is defined as "C2F," while the rear chamber part is defined as "C2R."

An internal vent hole provided between each chamber is represented using the numbers of the chambers coupled thereto, wherein, for example, an internal vent between the first chamber and the second chamber is "V1-2." Others also follow the same rule. A vent hole for discharging gas to the outside is collectively referred to by the symbol "VF" for convenience irrespective of the location within which the vent hole is provided.

Regarding the position of the end of chambers in the anteroposterior direction along the vehicle traveling direction, the front end thereof is labeled "f," while the rear end thereof is labeled "r." In addition, after f, r, the number (2) corresponding to the number (C2, etc.) of the chamber is assigned.

Note that in each example, while identical components are labeled with identical symbols, not identical but similar components may be labeled with identical symbols.

Example 1

FIG. 6 is a schematic view illustrating the deployed state of an airbag apparatus according to Example 1 of the present invention, corresponding to the cross section in the A2-A2 direction of FIG. 3. The side airbag apparatus 20 according to the present example includes: an airbag 34 for restraining a passenger when expanded and deployed; and an inflator 30 for supplying expansion gas to the airbag 34. The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, a rear end part r2 in an expanding region of the second chamber C2 is deployed so as to be disposed in front of a rear end part r1 of the first chamber C1, as seen from the vehicle side.

As illustrated in FIG. 6, in the present example, the inflator 30 is housed inside the first chamber C1. As the inflator 30, for example, a cylindrical cylinder type inflator can be used. A pair of upper and lower stud bolts 32 protrude from the outer peripheral part of the inflator 30 towards the inside in the vehicle width direction. These stud bolts 32 are attached (fastened and fixed) to the side frame 10 by nuts. Multiple gas jet ports arranged in the peripheral direction are formed in the inflator 30, with the gas radially ejected from the gas jet port. Note that a diffuser for controlling the flow of the gas can be provided as required.

An airbag control ECU (not illustrated) mounted on the vehicle is electrically connected to this inflator 30. A satellite sensor for detecting side collisions is electrically connected to this airbag control ECU. The inflator 30 can be configured to operate when the airbag control ECU detects a side collision based on a signal from this satellite sensor.

A vent hole V1-2 is formed between the first chamber C1 and the second chamber C2. In the present example, the front end f2 of the second chamber C2 is disposed in front of the front end f1 of the first chamber C1. As indicated by the dashed line arrows, the flow of the expansion gas flows from the first chamber C1 to the second chamber C2 via the vent hole V1-2, and then is discharged from an external vent hole VF formed at the front end of the second chamber C2.

According to the present example having the abovementioned configuration, the first chamber C1 is deployed outside the side support part in the initial stage of operating the airbag apparatus. At this time, because the first chamber C1 is deployed so as to overlap the frame side wall part 10a, as seen from the vehicle side, the first chamber C1 is assuredly deployed such that the frame side wall part 10a receives the reaction force of the first chamber C1. Subsequently, the second chamber C2 is deployed so as to quickly restrain a passenger P from moving to the outside in the vehicle width direction. At this time, the surface on the frame side of the second chamber C2 is supported by both this frame side wall part and the first chamber (which has already started to be deployed), with both the frame side wall part 10a and the first chamber C1 receiving the reaction force when the second chamber is deployed. Therefore, when the passenger P enters the second chamber C2, the pressure from the passenger P can be received by the frame side wall part 10a, making it possible to assuredly restrain the passenger P in the seat center direction.

Example 2

FIG. 7 is a schematic view illustrating the deployed state of an airbag apparatus according to Example 2 of the present invention, corresponding to the cross section in the A2-A2 direction of FIG. 3. The side airbag apparatus 20 according to the present example includes: an airbag 34 for restraining a passenger when expanded and deployed; and an inflator 30 for supplying expansion gas to the airbag 34. The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, a rear end part r2 in an expanding region of the second chamber C2 is deployed so as to be disposed in front of a rear end part r1 of the first chamber C1, as seen from the vehicle side.

The difference between the present example and the abovementioned Example 1 is only a strap (strip member) 36 provided at the rear end of the second chamber C2. The strap 36 couples the rear end of the second chamber C2 and the stud bolts 32. Note that the rear end of the strap 36 can be coupled to the side frame 10. In such a configuration, the deploying behavior, deployed shape, and deployed position in the anteroposterior direction of the second chamber C2 can be controlled.

Note that in the present example, along with other examples described below, other coupling structures can be employed instead of the strap 36. For example, a non-expanding region can be configured so as to be formed in the rear of the expanding region of the second chamber C2, with this non-expanding region capable of being configured so as to be coupled to the stud bolts 32 for attaching the side frame 10 or the inflator 30 to the side frame 10.

Example 3

FIG. 8 is a schematic view illustrating the deployed state of an airbag apparatus according to Example 3 of the present invention, corresponding to the cross section in the A2-A2 direction of FIG. 3. The side airbag apparatus 20 according to the present example includes: an airbag 34 for restraining a passenger when expanded and deployed; and an inflator 30 for supplying expansion gas to the airbag 34. The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, a rear end part r2 in an expanding region of the second chamber C2 is deployed so as to be disposed in front of a rear end part r1 of the first chamber C1, as seen from the vehicle side.

The present example is a modified example of the abovementioned Example 2, wherein the difference is that the second chamber C2 is sectioned into the front and rear so as to form a front chamber part C2F and a rear chamber part C2R. A partition panel P2 is arranged at the boundary part between the front chamber part C2F and the rear chamber part C2R, with a vent hole V2 formed at a portion thereof.

According to the present example, in addition to the effects of the abovementioned Examples 1 and 2, when the second chamber C2 is divided into the front chamber part C2F and the rear chamber part C2R, the width in the anteroposterior direction of the second chamber C2 is easily enlarged.

Example 4

FIG. 9 is a schematic view illustrating the deployed state of an airbag apparatus according to Example 4 of the present invention, corresponding to the cross section in the A2-A2 direction of FIG. 3. The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, a rear end part r2 in an expanding region of the second chamber C2 is deployed so as to be disposed in front of a rear end part r1 of the first chamber C1, as seen from the vehicle side.

Further, in the present example, a third chamber C3 coupled to this first chamber C1 is included on the side of the first chamber C1 opposite to (outside) the second chamber C2.

By employing such a configuration, compared with the case in which a wide range is protected with a single chamber, the deploying behavior of the airbag is more likely to be perceived, enabling the deployed shape and deployed position of the airbag to be accurately controlled.

An internal vent hole V1-3 is formed at the boundary part between the first chamber C1 and the third chamber C3 such that the gas inside the first chamber C1 flows into the third chamber C3. Therefore, the expansion gas branched from the first chamber C1 is separately fed into the second chamber C2 and the third chamber C3, respectively, thereby contributing to the quick deployment of the second chamber C2 and the third chamber C3.

Because the front end part of the third chamber C3 is disposed in front of the front end parts of the first chamber C1 and the second chamber C2, when seen as the deployed shape of the overall airbag, the width in the anteroposterior direction can be relatively easily increased.

Example 5

FIG. 10 is a schematic view illustrating the deployed state of an airbag apparatus according to Example 5 of the present invention, corresponding to the cross section in the A2-A2 direction of FIG. 3. The side airbag apparatus 20 according to the present example includes: an airbag 34 for restraining a passenger when expanded and deployed; and an inflator 30 for supplying expansion gas to the airbag 34. The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, a rear end part r2 in an expanding region of the second chamber C2 is deployed so as to be disposed in front of a rear end part r1 of the first chamber C1, as seen from the vehicle side.

The present example is a modified example of the abovementioned Example 4, with most configurations identical. The difference is that a partition panel P6 sections the third chamber C3 into a front chamber part C3F and a rear chamber part C3R, with a vent hole V3 provided at this partition panel P6.

According to the present example, in addition to the effects of the abovementioned Example 4, when the third chamber C3 is divided into the front chamber part C3F and the rear chamber part C3R, the width in the anteroposterior direction of the third chamber C3 is easily enlarged.

Example 6

FIGS. 11(A), (B) are schematic views illustrating the deployed state of an airbag apparatus according to Example 6 of the present invention, corresponding to the cross section in the A2-A2 direction of FIG. 3. The examples illustrated in both figures (A) and (B) are configured based on the same concept, only differing in terms of the configuration and structure of a fourth chamber C4.

The side airbag apparatus 20 according to the present example includes: an airbag 34 for restraining a passenger when expanded and deployed; and an inflator 30 for supplying expansion gas to the airbag 34. The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, a rear end part r2 in an expanding region of the second chamber C2 is deployed so as to be disposed in front of a rear end part r1 of the first chamber C1 and hardly overlap the frame side wall part 10a as seen from the vehicle side.

In the present example, the fourth chamber C4 coupled to the front end of the first chamber C1 and the side face of the second chamber C2 is further included. In addition, an internal vent hole V2-4 is formed at the boundary part between the second chamber C2 and the fourth chamber C4 such that the gas inside the second chamber C2 flows into the fourth chamber C4. Note that the first chamber C1 and the fourth chambers C4 are completely separated.

In the example illustrated in figure (A), the fourth chamber C4 is disposed outside the side frame 10, so as to be deployed in front of the first chamber C1 and outside the second chamber C2.

On the other hand, in the example illustrated in figure (B), the fourth chamber C4 is deployed in front of the first chamber and in front of the side frame 10, in addition to being partially disposed in front of the second chamber C2. The structure as in figure (B) advantageously allows the flow of gas to smoothly reach the fourth chamber C4 from the first chamber C1 via the second chamber C2.

In the present example, the expansion gas flows in the order of the first chamber C1, the second chamber C2, and the fourth chamber C4, and is expanded and deployed in this order. Therefore, the passenger P is quickly restrained by the first chamber C1 and the second chamber C2 in an early stage, allowing the restraint range to be widely assured by the fourth chamber C4.

Example 7

FIGS. 12(A), (B) are schematic views illustrating the deployed state of an airbag apparatus according to Example 7 of the present invention, corresponding to the cross section in the A2-A2 direction of FIG. 3. The examples illustrated in both figures (A) and (B) are configured based on the same concept, only differing in terms of the configuration and structure of a fourth chamber C4.

The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, the second chamber C2 is deployed such that, as seen from the vehicle side, the front part does not overlap the first chamber C1, while the rear part thereof overlaps the frame side wall part 10a.

The greatest characteristic of the side airbag apparatus according to the present example is the further inclusion of the fourth chamber C4 housing the first chamber C1 outside the frame side wall part 10a. The presence of the fourth chamber C4 allows the capacity of the first chamber C1 to be relatively small, while the gas emitted from the inflator 30 is more likely to be introduced in the desired direction, resulting in improved rectification effects of the gas.

The fourth chamber C4 is sectioned into a front chamber part C4F and a rear chamber part C4R, with the internal vent hole V4 provided at this section part. Moreover, the vent hole V1-2 is formed at the boundary part between the first chamber C1 and the second chamber C2, while the vent hole V2-4 is formed at the boundary part between the second chamber C2 and the rear chamber part C4R the fourth chamber C4. In addition, the gas emitted from the inflator flows in the order of the first chamber C1, the second chamber C2, the rear chamber part C4R of the fourth chamber C4, and the front chamber part C4F of the fourth chamber C4.

In the example illustrated in figure (A), the fourth chamber C4 (C4F, C4R) is disposed outside the side frame 10, so as to be deployed in front of the first chamber C1 and outside the second chamber C2.

On the other hand, in the example illustrated in figure (B), the fourth chamber C4 (specifically, C4F) is deployed in front of the first chamber and in front of the side frame 10, in addition to being partially disposed in front of the second chamber C2. The structure as in figure (B) advantageously allows the flow of gas to smoothly reach the fourth chamber C4 from the first chamber C1 via the second chamber C2.

Example 8

FIG. 13 is a schematic view illustrating the deployed state of an airbag apparatus according to Example 8 of the present invention, corresponding to the cross section in the A2-A2 direction of FIG. 3. The side airbag apparatus 20 according to the present example includes: an airbag 34 for restraining a passenger when expanded and deployed; and an inflator 30 for supplying expansion gas to the airbag 34. The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, the second chamber C2 is deployed so as not to overlap the rear part of the first chamber C1, as seen from the vehicle side.

The greatest characteristic of the present example is the fact that the first chamber C1 and the second chamber C2 are configured as one chamber. A single chamber is folded so as to hold the frame side wall part 10a. According to the present example, the number of panels constituting the airbag 34 can be decreased to simplify the overall panel structure.

The airbag 34 further includes the third chamber C3 coupled to the outside of the first chamber C1, with the internal vent hole V1-3 provided between the first chamber C1 and the third chamber C3.

In the present example, the gas emitted from the inflator 30 passes inside the first chamber C1 so as to be branched into the second chamber C2 side and the third chamber C3 side in the vicinity of the front end of the frame side wall part 10a.

Example 9

FIG. 14 is a schematic view illustrating the deployed state of an airbag apparatus according to Example 9 of the present invention, corresponding to the cross section in the A2-A2 direction of FIG. 3. The side airbag apparatus 20 according to the present example includes: an airbag 34 for restraining a passenger when expanded and deployed; and an inflator 30 for supplying expansion gas to the airbag 34. The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, the second chamber C2 is deployed so as not to overlap the rear part of the first chamber C1, as seen from the vehicle side.

The present example is a modified example of the abovementioned Example 8, with most configurations identical. The difference is that the third chamber C3 is sectioned into a front chamber part C3F and a rear chamber part C3R, with the internal vent hole V3 provided at this section part.

Example 10

FIGS. 15(A), (B) are schematic views illustrating the deployed state of an airbag apparatus according to Example 10 of the present invention, corresponding to the cross section in the A2-A2 direction of FIG. 3. The examples illustrated in both figures (A) and (B) are configured based on the same concept, only differing in terms of the configuration and structure of a fourth chamber C4. FIG. 16 is a side view illustrating the deployed state of the airbag apparatus illustrated in FIG. 15, in addition to illustrating the configuration and shape of panels constituting the airbag.

The side airbag apparatus 20 according to the present example includes: an airbag 34 for restraining a passenger when expanded and deployed; and an inflator 30 for supplying expansion gas to the airbag 34. The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, as seen from the vehicle side, the rear end part r2 in the expanding region of the second chamber C2 is disposed slightly in front of the rear end part r1 of the first chamber C1, but extends substantially rearward towards the position of the stud bolts 32.

The present example is a modified example of the abovementioned Example 9, with most configurations identical. The difference is that a protruding expanding part C2P is formed in the rear of the second chamber C2. Note that, needless to say, the protruding expanding part C2P of the second chamber C2 employed in the present example can also be applied to the abovementioned Examples 1 to 9.

As illustrated in FIG. 16(B), the protruding expanding part C2P is divided into a part C2PU disposed above two holes 32U, 32L for the stud bolts 32, along with a part C2PL disposed therebelow. In addition, in order to avoid the position of each hole 32U, 32L for the stud bolt 32, that is, the attachment position of the inflator 30, protruding expanding parts C2PU, C2PL are formed. A non-expanding region 136 is disposed between these two protruding expanding parts C2PU, C2PL, with this non-expanding region 136 fastened and fixed to the stud bolts 32.

Note that the non-expanding region 136 functions in the same way as the strap 36 in the abovementioned other examples. That is, by coupling and fixing the non-expanding region 136 to the stud bolts 32, the deploying behavior, deployed shape, and deployed position in the anteroposterior direction of the second chamber C2 can be controlled.

In the example illustrated in FIG. 15(A), the fourth chamber C4 (C4F, C4R) is disposed outside the side frame 10, so as to be deployed in front of the first chamber C1 and outside the second chamber C2.

On the other hand, in the example illustrated in FIG. 15 (B), the fourth chamber C4 (specifically, C4F) is deployed in front of the first chamber and in front of the side frame 10, in addition to being partially disposed in front of the second chamber C2. The structure as in figure (B) advantageously allows the flow of gas to smoothly reach the fourth chamber C4 from the first chamber C1 via the second chamber C2.

Example 11

FIG. 17 is a schematic view illustrating the deployed state of an airbag apparatus according to Example 11 of the present invention, corresponding to the cross section in the A2-A2 direction of FIG. 3. The examples illustrated in both figures (A) and (B) are configured based on the same concept, only differing in terms of the configuration and structure of a fourth chamber C4. Note that because the present example has a large number of parts common to Example 6 illustrated in FIG. 11, descriptions will be provided focusing on the differences from Example 6 in order to facilitate understanding.

In the side airbag apparatus according to the present example, at least one vent hole V1-4 is formed at the boundary part between the fourth chamber C4 and the first chamber C1 such that the gas inside the first chamber C1 flows into the fourth chamber C4. In contrast, in the example illustrated in FIG. 11, a vent hole V2-4 present at the boundary part between the second chamber C2 and the fourth chamber C4 is not provided in the present example.

In the present example, because the expansion gas is configured to flow from the first chamber C1 to the second chamber C2 and the fourth chamber C4, the second chamber C2 and the fourth chamber C4 are substantially simultaneously expanded and deployed. Therefore, advantageously, the passenger can be substantially simultaneously protected by the fourth chamber (main chamber) C4 and the second chamber (pre-push chamber) C2. For example, even in a state in which the passenger P sits slightly on the tip side of a seating face of a seat and cannot be sufficiently restrained by the second chamber C2, the fourth chamber C4 enables the passenger P4 to be quickly and assuredly restrained in the initial stage of the collision.

In the example illustrated in figure (A), the fourth chamber C4 (C4F, C4R) is disposed outside the frame side wall part 10a of the side frame 10, so as to be deployed in front of the first chamber C1 and outside the second chamber C2.

On the other hand, in the example illustrated in figure (B), the fourth chamber C4 (specifically, C4F) is deployed in front of the first chamber and in front of the frame side wall part 10a of the side frame 10, in addition to being partially disposed in front of the second chamber C2.

Example 12

FIG. 18 is a schematic view illustrating the deployed state of an airbag apparatus according to Example 12 of the present invention, corresponding to the cross section in the A2-A2 direction of FIG. 3. The examples illustrated in both figures (A) and (B) are configured based on the same concept, only differing in terms of the configuration and structure of a fourth chamber C4. FIG. 19 is a side view illustrating the deployed state of the airbag apparatus illustrated in FIG. 18, in addition to illustrating the configuration and shape of panels constituting the airbag. Note that because the present example has a large number of parts common to Example 10 illustrated in FIG. 15, descriptions will be provided focusing on the differences from Example 10 in order to facilitate understanding.

Unlike Example 10, in the present example, when the airbag in the deployed state is observed from the vehicle width direction, the second chamber C2 is configured so as not to overlap the frame side wall part 10a of the side frame 10. A front wall part 210 which protrudes towards the inside (inside in the vehicle width direction) of the vehicle is formed at the front end of the frame side wall part 10a and supported such that the rear end part of the second chamber C2 abuts this front wall part 210.

Moreover, in addition to the fourth chamber C4, the first chamber C1 is provided so as to surround the inflator 30 in the so-called bag-in bag-out form.

With reference to FIG. 19(B), the specific range 200 at the rear edge part of the second chamber C2 is molded so as to be curved along a smoothly swelled front edge shape of a side wall part 10a of the side frame 10. Such a structure enables the second chamber C2 to be closely adhered to the front edge of the side wall part 10a, allows the reaction force to be obtained in this closely adhered region, stabilizes the deployed shape of the second chamber C2, and further enables quick and assured forward deployment.

In the example illustrated in FIG. 18(A), the fourth chamber C4 (C4F, C4R) is disposed outside the side frame 10 so as to be deployed in front of the first chamber C1 and outside the second chamber C2.

On the other hand, in the example illustrated in FIG. 18(B), the fourth chamber C4 (specifically, C4F) is deployed in front of the first chamber and in front of the side frame 10, in addition to being partially disposed in front of the second chamber C2. The structure as in figure (B) advantageously allows the flow of gas to smoothly reach the fourth chamber C4 from the first chamber C1 via the second chamber C2.

(Interpretation of the Technical Scope of the Present Invention)

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative but not limiting. Without departing from the spirit and scope of the present invention, the described embodiments may take on various modifications. For example, while a side airbag apparatus on the near side has been predominantly mentioned in the Description of the Preferred Embodiment, use is also possible with a far side airbag apparatus (surface on the far side from a vehicle door of a vehicle seat), in very small vehicles such as a single seat vehicle (irrespective of the presence of a door, a vehicle including parts with only one seat in a single row), and the like.

The invention claimed is:
1. A passenger protection apparatus comprising:
a vehicle seat having a seat cushion forming a seating face along with a seat back forming a backrest; and
a side airbag apparatus housed in the vehicle seat,
the seat back including a side support part which expands in a forward vehicle traveling direction,
a side frame part having a frame side wall part which extends in the vehicle forward traveling direction the side frame part arranged inside the side support part,
the side airbag apparatus including an airbag for restraining a passenger when expanded and deployed and an inflator for supplying expansion gas to the airbag, the airbag including a first chamber which houses the inflator and is deployable outside the frame side wall part in the a vehicle width direction; a second chamber which is deployable inside the frame side wall part in the vehicle width direction; and a third chamber coupled to the first chamber on a side of the first chamber opposite the second chamber, the first chamber being deployable such that at least a portion of the first chamber overlaps the frame side wall part in the vehicle width direction, and a rear end part of an expanding region of the second chamber, is formed in front of a rear end part of the first chamber, wherein the front end part of the third chamber is disposed in front of the front end parts of the first chamber and the second chamber wherein the second chamber is coupled to the first chamber on a laterally inboard side of the first chamber and the third chamber is coupled to the first chamber on a laterally outboard side of the first chamber, and wherein a protruding expanding part which protrudes rearward relative to the third chamber so as to be expanded and deployed is formed in a portion of the second chamber.

2. A passenger protection apparatus comprising:
a vehicle seat having a seat cushion and a seat back, the seat cushion forming a seating face, the seat back forming a backrest; and
a side airbag apparatus housed in the vehicle seat,
the seat back includes a side support part which expands in a forward vehicle traveling direction in a vehicle width direction,
a side frame part having a frame side wall part which extends in the forward vehicle traveling direction and is arranged inside the side support part,
the side airbag apparatus including an airbag for restraining a passenger when expanded and deployed; and an inflator for supplying expansion gas to the airbag,
the airbag including a first chamber which houses the inflator and is deployable outside the frame side wall part in a vehicle width direction; and a second chamber which is deployable inside the frame side wall part in the vehicle width direction,
the first chamber is deployable such that at least a portion of the first chamber overlaps the frame side wall part in the vehicle width direction,
the first chamber and the second chamber are provided so as to at least partially hold the frame side wall part,
wherein the second chamber is configured to be deployed entirely forward of the inflator.

3. The passenger protection apparatus according to claim 1, wherein the second chamber is deployed so as not to overlap the frame side wall part, as seen from the vehicle side.

4. The passenger protection apparatus according to claim 1, wherein at least one first internal vent hole is formed at the boundary part between the first chamber and the second chamber such that the gas inside the first chamber flows into the second chamber.

5. The passenger protection apparatus according to claim 1, wherein the first chamber and the second chamber are configured as one chamber.

6. A passenger protection apparatus comprising:
a vehicle seat having a seat cushion forming a seating face along with a seat back forming a backrest; and
a side airbag apparatus housed in the vehicle seat, the seat back including a side support part which expands in a forward vehicle traveling direction,
a side frame part having a frame side wall part which extends in the vehicle forward traveling direction the side frame part arranged inside the side support part,
the side airbag apparatus including an airbag for restraining a passenger when expanded and deployed and an inflator for supplying expansion gas to the airbag,
the airbag including a first chamber which houses the inflator and is deployable outside the frame side wall part in the a vehicle width direction; a second chamber which is deployable inside the frame side wall part in the vehicle width direction; and a third chamber coupled to the first chamber on a side of the first chamber opposite the second chamber, the first chamber being deployable such that at least a portion of the first chamber overlaps the frame side wall part in the vehicle width direction, and a rear end part of an expanding region of the second chamber, is formed in front of a rear end part of the first chamber, wherein the front end part of the third chamber is disposed in front of the front end parts of the first chamber and the second chamber wherein the second chamber is coupled to the first chamber on a laterally inboard side of the first chamber and the third chamber is coupled to the first chamber on a laterally outboard side of the first chamber, and, wherein:
the second chamber is sectioned by a section part into a front chamber part and a rear chamber part, and
at least one second internal vent hole is provided in the section part.

7. The passenger protection apparatus according to claim 1, wherein:
the third chamber is sectioned into a front chamber part and a rear chamber part, and
at least one vent hole is provided in this section part.

8. The passenger protection apparatus according to claim 1, wherein the airbag further includes a fourth chamber which is disposed in front of the first chamber and coupled to a side face of the second chamber.

9. The passenger protection apparatus according to claim 1, wherein the airbag further includes a fourth chamber which is disposed on the front side of the first chamber and the side frame part and coupled to the second chamber.

10. The passenger protection apparatus according to claim 8, wherein the rear part of the fourth chamber is provided outside the side frame so as to cover the outside in the vehicle width direction of the second chamber, while the first chamber is provided as a gas guide to the second chamber.

11. A passenger protection apparatus comprising:
a vehicle seat having a seat cushion forming a seating face and a seat back forming a backrest; and
a side airbag apparatus housed in vehicle seat,
the seat back including a side support part which expands in a forward vehicle traveling direction in a vehicle width direction,
a side frame part having a frame side wall part which extends in the forward vehicle traveling direction and is arranged inside the side support part,
the side airbag apparatus including an airbag for restraining a passenger when expanded and deployed; and an inflator for supplying expansion gas to the airbag, the airbag including a first chamber which houses the inflator and is deployable outside the frame side wall part in the vehicle width direction; a second chamber which is deployable inside in the frame side wall part in the vehicle width direction, the first chamber deployable such that at least a portion of the first chamber overlaps the frame side wall part in the vehicle width direction, and the rear end part of an expanding region of the second chamber is formed in front of the rear end part of the first chamber, wherein the airbag further includes a further chamber which is disposed in front of the first chamber and coupled to a side face of the second chamber, and wherein the rear part of the further chamber is provided outside the side frame so as to cover the outside in the vehicle width direction of the first chamber, while the first chamber is provided as a gas guide to the second chamber.

12. The passenger protection apparatus according to claim 1, wherein the airbag further includes a fourth chamber coupled to the outside in the vehicle width direction of a side face of the second chamber, wherein the first chamber is provided inside the fourth chamber in a bag-in bag-out form.

13. The passenger protection apparatus according to claim 12, wherein the fourth chamber is provided so as to be disposed on the front side of the side frame part.

14. The passenger protection apparatus according to claim 8, wherein the front end part of the fourth chamber is disposed in front of the front end part of the second chamber.

15. The passenger protection apparatus according to claim 8, wherein the fourth chamber is coupled to the front end of the first chamber and the side face of the second chamber.

16. The passenger protection apparatus according to claim 1, wherein an external vent hole for discharging the expansion gas to the outside is provided at the frontmost part of the airbag.

17. The passenger protection apparatus according to claim 1, further comprising a strap having a front end coupled to the rear side of the second chamber, wherein the rear end of the strap is coupled to a stud bolt for attaching the side frame or the inflator to the side frame.

18. The passenger protection apparatus according to claim 1, wherein a non-expanding region is formed in the rear of the expanding region of the second chamber, and wherein this non-expanding region is coupled to a stud bolt for attaching the side frame or the inflator to the side frame.

* * * * *